US012633816B1

(12) United States Patent
Awal

(10) Patent No.: US 12,633,816 B1
(45) Date of Patent: May 19, 2026

(54) CASCADED DC MODULAR SOLID-STATE TRANSFORMER

(71) Applicant: EPC Power Corporation, Poway, CA (US)

(72) Inventor: M A Awal, Poway, CA (US)

(73) Assignee: EPC POWER CORPORATION, Poway, CA (US)

( * ) Notice: Subject to any disclaimer, the term of this patent is extended or adjusted under 35 U.S.C. 154(b) by 0 days.

(21) Appl. No.: 19/409,698

(22) Filed: Dec. 4, 2025

(51) Int. Cl.
  H02M 3/337 (2006.01)
  H02M 1/00 (2006.01)
  (Continued)

(52) U.S. Cl.
  CPC ......... H02M 1/007 (2021.05); H02M 1/0095 (2021.05); H02M 1/083 (2013.01);
  (Continued)

(58) Field of Classification Search
  CPC ...... H02M 7/519; H02M 7/521; H02M 7/523; H02M 7/75; H02M 7/757; H02M 7/7575; H02M 7/66; H02M 7/68; H02M 7/72; H02M 7/483; H02M 2007/4835; H02M 7/487; H02M 1/08; H02M 1/084; H02M 1/0845; H02M 7/515; H02M 7/525;
  (Continued)

(56) References Cited

U.S. PATENT DOCUMENTS 3,517,300 A * 6/1970 Mcmurray ............ H02M 5/225
                                                363/160
10,063,158 B1 8/2018 Li et al.
                (Continued)

OTHER PUBLICATIONS

Cervone et al., "Modularized Diode Rectifiers: A New Family of Solid-State Transformers," (2025), IEEE Transactions on Power Electronics, vol. 40, No. 4, pp. 4747-4751.
(Continued)

*Primary Examiner* — Crystal L Hammond
*Assistant Examiner* — Nusrat Quddus
(74) *Attorney, Agent, or Firm* — Foley & Lardner LLP

(57)              ABSTRACT
A solid-state transformer system comprises a plurality of isolated DC-DC converter modules, each module having a medium voltage port and a low voltage port. The medium voltage ports are series-connected in each phase of a single-phase or three-phase configuration to form a medium voltage AC interface, and each module comprises two quadrant switches with no active front end. The system includes a controller configured to generate voltage references for each module, the voltage references comprising a DC common-mode component and an AC differential-mode component, and optionally an AC common-mode component, wherein the DC common-mode component ensures unidirectional voltage operation across the medium voltage port of each module. The low voltage ports are interconnected to form a low voltage DC interface. The isolated DC-DC converter modules utilize conversion topologies including frequency modulated resonant converters, phase-shift modulated converters, and hybrid conversion topologies, operating at frequencies between 20 kHz and 100 kHz to achieve soft switching operation over wide operating ranges for improved efficiency and simplified manufacturability.

24 Claims, 17 Drawing Sheets

Module #xk

Module #xk

(51) Int. Cl.
H02M 1/08 (2006.01)
H02M 3/00 (2006.01)
H02M 3/335 (2006.01)
*H02M 1/44* (2007.01)

(52) U.S. Cl.
CPC ......... H02M 3/01 (2021.05); H02M 3/33584
(2013.01); H02M 3/3378 (2013.01); *H02M*
*1/44* (2013.01); *H02M 3/33523* (2013.01)

(58) Field of Classification Search
CPC ...... H02M 7/527; H02M 7/529; H02M 7/539;
H02M 3/073; H02M 3/10; H02M 3/135;
H02M 3/137; H02M 3/28; H02M 3/315;
H02M 3/3155; H02M 3/325; H02M
3/335; H02M 7/10; H02M 7/53; H02M
7/537; H02M 7/5383; H02M 7/538466;
H02M 7/53862; H02M 7/5387; H02M
7/53871; H02M 7/53875; H02M 7/79;
H02M 3/337; H02M 3/338; H02M
3/3382; H02M 3/3384; H02M 7/538;
H02M 7/53806; H02M 7/53832; H02M
7/53835; H02M 7/23; H02M 7/217;
H02M 7/21; H02M 7/12; H02M 7/04;
H02M 7/00; H02M 3/1582; H02M
3/1584; H02M 3/285; H02M 3/33561;
H02M 7/49; H02M 1/045; H02M 7/006;
H02M 7/06; H02M 7/068; H02M 7/153;
H02M 1/088; H02M 7/103; H02M 7/106;
H02M 7/19; H02M 7/08; H02M 7/17;
H02M 2001/007; H02M 7/493; H02M
7/5381; H02M 7/53873; H02M 5/2573;
H02M 1/081; H02M 5/293; H02M 3/125;
H02M 3/13; H02M 3/145; H02M 3/15;
H02M 3/155; H02M 3/156; H02M 3/158;
H02M 3/1588; H02M 2003/1566; H02M
2003/1557; H02J 3/46; H02J 3/38; G05F
1/00; G05F 1/10; G05F 1/12; G05F 1/46;
G05F 1/455; G05F 1/45; G05F 1/445;
G05F 1/66; G05F 1/40; G05F 1/42; G05F
1/44; G05F 1/462; G05F 1/52; G05F
1/56; G05F 3/10; G05F 3/16; G05F 3/18;
G05F 3/185; G05F 3/20; G05F 3/26;
G05F 3/30; G05F 3/205; G05F 3/22;
G05F 3/24; G05F 3/222; G05F 3/242;
G05F 3/225; G05F 3/227; G05F 3/245;
G05F 3/247; G05F 3/262; G05F 3/265;
G05F 3/267; G05F 1/575; H05B 39/048;
B23K 11/24; H04B 2215/069
See application file for complete search history.

(56) References Cited

U.S. PATENT DOCUMENTS

| | | | | |
|---|---|---|---|---|
| 10,439,407 | B2 | 10/2019 | Götz | |
| 10,491,098 | B2 * | 11/2019 | Chen | H02M 5/225 |
| 11,152,918 | B1 * | 10/2021 | Koplow | H02M 5/225 |
| 11,431,263 | B2 | 8/2022 | Zhang et al. | |
| 11,611,289 | B2 | 3/2023 | Liu et al. | |
| 11,632,052 | B2 | 4/2023 | Landseadel | |
| 11,791,628 | B2 * | 10/2023 | Ortiz | H02J 1/08 |
| | | | | 307/24 |
| 11,811,301 | B1 | 11/2023 | Raju | |
| 11,870,352 | B2 | 1/2024 | Mohan et al. | |
| 11,881,765 | B2 | 1/2024 | Ergin et al. | |
| 11,894,782 | B2 | 2/2024 | Yu et al. | |
| 11,984,815 | B2 * | 5/2024 | Awal | H02M 7/797 |
| 12,184,060 | B1 * | 12/2024 | Doynov | H02J 4/00 |
| 12,334,832 | B2 | 6/2025 | Winter et al. | |
| 2008/0304300 | A1 * | 12/2008 | Raju | H02M 7/217 |
| | | | | 363/125 |
| 2013/0201733 | A1 * | 8/2013 | Divan | H02M 5/00 |
| | | | | 363/39 |
| 2019/0238088 | A1 | 8/2019 | Zhuang et al. | |
| 2020/0412273 | A1 | 12/2020 | Lukic et al. | |
| 2021/0344283 | A1 * | 11/2021 | Zhou | H02M 3/1582 |
| 2022/0416684 | A1 * | 12/2022 | Awal | H02M 7/219 |
| 2023/0006535 | A1 * | 1/2023 | Freijedo Fernández | |
| | | | | H02M 1/0025 |
| 2023/0071239 | A1 | 3/2023 | Dias et al. | |
| 2023/0344240 | A1 * | 10/2023 | Freijedo Fernández | |
| | | | | H02M 1/007 |
| 2023/0369959 | A1 | 11/2023 | Shu et al. | |
| 2024/0297590 | A1 | 9/2024 | Jaksa | |
| 2024/0339933 | A1 | 10/2024 | Weng et al. | |
| 2024/0356333 | A1 * | 10/2024 | Kasicheyanula | H02J 3/17 |
| 2025/0080002 | A1 | 3/2025 | Desingu et al. | |
| 2025/0226737 | A1 | 7/2025 | Huang et al. | |
| 2025/0239945 | A1 | 7/2025 | Li et al. | |

OTHER PUBLICATIONS

Huang, A., "Medium-Voltage Solid-State Transformer: Technology for a Smarter and Resilient Grid," (2016), IEEE Industrial Electronics Magazine, vol. 10, No. 3, pp. 29-42.

Liu et al., "Single-Stage Control System of I-MMC-Based Island MVDC Link Receiver With Multiple Modulation Freedoms," (2020), IEEE Access, vol. 8, pp. 10088-10097.

Qin et al., "Solid-State Transformer Architecture Using AC-AC Dual-Active-Bridge Converter," (2013), IEEE Transactions on Industrial Electronics, vol. 60, No. 9, pp. 3720-3730.

She et al., "Review of Solid-State Transformer Technologies and Their Application in Power Distribution Systems," (2013), IEEE Journal of Emerging and Selected Topics in Power Electronics, vol. 1, No. 3, pp. 186-198.

Adam et al., "Model predictive control for quad active bridge DC-DC converter for more electric aircraft applications," (2025), Scientific Reports, vol. 15, 31 pages.

Al-Mahdawi et al., "Solid-State Transformers: A Game-Changer for Off-Grid and Emergency Power Systems," (2025), International Journal of Recent Technology and Engineering (IJRTE), 8 pages.

Bipu et al., "Design, Control, and Protection of a 13.2 kV, 1MVA Solid State Transformer for Electric Vehicle Extreme Fast Charging Station," (2025), IEEE Transactions on Transportation Electrification, 13 pages.

Chandran et al., "Solid State Transformers: A Comprehensive Review of Technology, Topologies, Applications, Research Gaps, and Future Directions," (2025), Journal of Power and Energy Engineering, vol. 13, pp. 30-64.

Deng et al., "Efficiency Improvement of Solid-State Transformers With MMC Front-End AC-DC Converters Through Adjusting DC Bus Voltage and Active Cells," (2024), IEEE Transactions on Power Electronics, vol. 39, No. 10, 16 pages.

Dutta et al., "A Decentralized Soft-start Method for a Cascaded H-Bridge and Quad-Active Bridge-based Medium Voltage AC-DC Converter," (2025), IEEE Transactions, 8 pages.

F. Krismer, "Modeling and Optimization of Bidirectional Dual Active Bridge DC-DC" Converter Topologies, (2010), Ph.D. Dissertation, ETH Zurich, 459 pages.

Farzamkia et al., "A Single-Stage Bidirectional Modular Multilevel Converter based Solid-State Transformer," IEEE Transactions on Power Electronics, DOI: 10.1109/TPEL.2025.3613454, 11 pages.

Hannan et al., "State of the Art of Solid-State Transformers: Advanced Topologies, Implementation Issues, Recent Progress and Improvements," (2020), IEEE Access, vol. 8, pp. 19113-19132.

Kim et al., "Development of medium voltage single-phase solid-state transformer for high-speed railway vehicles: Reduced scale verification results," (2025), High Voltage, vol. 10, pp. 555-569.

Li et al., "Partial Fluctuation Power Control of Resonant Converter in Solid-State Transformer," (2024), IEEE Transactions on Industrial Electronics, 10 pages.

(56)           References Cited

OTHER PUBLICATIONS

Liserre et al., "Last Developments and New Technologies in Solid-State Transformer," (2024), IEEE 15th International Symposium on Power Electronics for Distributed Generation Systems, 9 pages.

Queiroz et al., "Design of a Modular Multilevel DC/DC Converter to Solid-State Transformer in a Green Hydrogen System," (2024), IEEE Applied Power Electronics Conference and Exposition, APEC 2024, pp. 2282-2288.

Zheng et al., "SiC-Based 5-KV Universal Modular Soft-Switching Solid-State Transformer (M-S4T) for Medium-Voltage DC Microgrids and Distribution Grids," (2021), IEEE Transactions on Power Electronics, vol. 36, No. 10, 18 pages.

Zhengzhao et al., "Comparison of Modular Multilevel Converter Based Solid State Transformer for AC/DC Applications," (2023), IECON 49th Annual Conference of the IEEE Industrial Electronics Society, 8 pages.

Zhu et al., "Isolated Modular Multilevel Matrix Converter (I-M3C) Based Novel Solid-State Transformer (SST) With Low-Frequency Medium-Voltage AC Port," (2024), IEEE Transactions on Power Electronics, 15 pages.

* cited by examiner

CASCADED DC MODULAR SOLID-STATE TRANSFORMER

BACKGROUND

The electric power grid is undergoing a fundamental transformation driven by rapidly expanding sectors including artificial intelligence data centers and electric vehicle charging infrastructure. These applications have created unprecedented demand for efficient, high-power medium voltage AC to low voltage DC power conversion systems. The conventional approach to MVAC-LVDC conversion relies on bulky low-frequency transformers for voltage step-down, followed by rectification and DC-DC conversion stages, but the low-frequency transformer industry is experiencing an unprecedented supply chain crisis that has renewed interest in solid-state transformer alternatives.

Traditional low-frequency transformers suffer from several fundamental limitations that make them increasingly unsuitable for modern power system applications. Low-frequency transformers constructed from copper and iron cores are inherently bulky and heavy due to the low operating frequency, which necessitates large magnetic cores to achieve the required flux linkage. This results in significant installation footprint requirements and transportation challenges, particularly problematic for urban data center deployments where real estate costs are substantial.

Existing modular solid-state transformer topologies, including cascaded H-bridge and modular multilevel converter-based approaches, face challenges in voltage balancing, start-up control complexity, and protection coordination across multiple distributed modules. These systems typically require hard-switched active front ends and additional differential mode filtering, resulting in high component count, manufacturing complexity, and efficiency limitations. The disclosed technology addresses these deficiencies by providing a cascaded DC modular architecture that eliminates the need for hard-switched active front ends while enabling soft switching operation over wide operating ranges for improved efficiency and simplified manufacturability.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The present description relates to a solid-state transformer system comprising a plurality of isolated DC-DC converter modules, each module having a medium voltage port and a low voltage port. The medium voltage ports of the modules are series-connected in each phase of a single-phase or three-phase configuration to form a medium voltage AC interface, and each module comprises two quadrant switches with no active front end. The system includes a controller configured to generate voltage references for each module, the voltage references comprising a DC common-mode component and an AC differential-mode component, and optionally an AC common-mode component, wherein the DC common-mode component ensures unidirectional voltage operation across the medium voltage port of each module. The low voltage ports of the modules are interconnected to form a low voltage DC interface.

The description also encompasses a method of controlling the cascaded modular solid-state transformer and a three-terminal solid-state transformer system having upper arm modules and lower arm modules in each phase of a three-phase configuration. The three-terminal system includes a medium voltage DC interface formed by connecting positive terminals of uppermost modules and negative terminals of lowermost modules, and a medium voltage AC interface formed at junctions between the upper arm modules and lower arm modules of each phase. The system enables single-stage medium voltage AC to low voltage DC power conversion using cascaded DC modules without hard-switched active front ends, providing improved efficiency through soft switching operation and simplified manufacturability.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
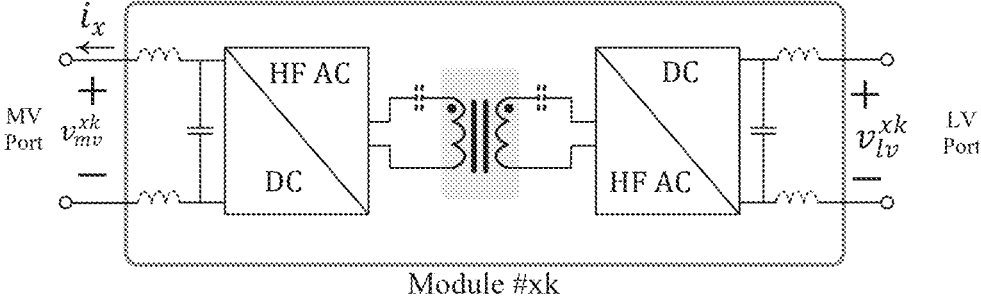
FIG. 1 depicts a schematic diagram of a single-phase module for a cascaded DC modular solid-state transformer, according to aspects of the present disclosure.

Referring to FIG. 1, a single-phase module forms a building block of a cascaded DC modular solid-state transformer architecture. The single-phase module comprises an isolated DC-DC converter having a medium voltage port and a low voltage port. The medium voltage port connects to a single AC grid phase and includes a DC bus capacitor and optionally a filtering inductor for voltage regulation and current smoothing. A DC to HF AC converter block connects to the medium voltage port and converts unipolar DC voltage to high-frequency AC voltage.

The single-phase module further includes a medium/high-frequency transformer that provides galvanic isolation and voltage transformation between the medium voltage side and low voltage side of the module. The transformer operates at frequencies between 2 kHz and 500 kHz, enabling reduced size and weight compared to conventional low-frequency transformers. An HF AC to DC converter block connects to the low voltage side of the transformer and converts the high-frequency AC voltage back to DC voltage for the low voltage port.

The low voltage port includes associated filtering components such as inductors and capacitors to provide smooth DC output. The single-phase module comprises two quadrant switches on both the medium voltage side and the low voltage side. The two quadrant switches enable bidirectional power flow operation between the medium voltage port and low voltage port through the high-frequency AC conversion and magnetic isolation provided by the transformer.

Term Definitions

As used herein, "two quadrant switches" refer to semiconductor switching devices capable of conducting current in one direction while blocking voltage in both directions, usually implemented with a transistor (e.g., IGBT, MOSFET, SiC, or GaN device) in series with an anti-parallel diode, enabling bidirectional voltage blocking with unidirectional current conduction when the transistor is off, and bidirectional current conduction when the transistor is on.

As used herein, "no active front end" means the module does not include an AC-DC rectification stage with actively controlled semiconductor switches operating at the AC line frequency (50/60 Hz)/or at a higher frequency for converting AC voltage to DC voltage prior to the high-frequency DC-AC conversion stage. Unlike conventional CHB topologies that require hard-switched active front ends with diode bridges or IGBT or FET bridges operating at line frequency for AC-DC conversion, the disclosed modules use only two-quadrant switches that operate at high frequency for DC-HF AC conversion, eliminating the need for the rectification stages.

As used herein, "medium voltage" refers to voltage levels typically in the range of 1 kV to 69 kV, and "low voltage" refers to voltage levels typically below 1 kV, though the specific voltage levels may vary depending on the application and regional standards. "Isolated DC-DC converter modules" encompasses the various topologies described including LLC, CLLL, DAB, push-pull, and other configurations, where the common feature is galvanic isolation through a medium/high-frequency transformer.

Isolated DC-DC Converter Topologies

The isolated DC-DC converter modules utilize various conversion topologies to achieve efficient power transfer. The modules use pulse-width modulated conversion such as push-pull converters, frequency modulated resonant conversion such as LLC resonant converters or CLLC resonant converters. Alternatively, the modules use phase-shift modulated power conversion such as dual active bridge converters or multi-active bridge converters. The modules also use hybrid conversion topologies such as quasi-resonant dual/multi-active bridge converters that combine benefits of both resonant and phase-shift modulation techniques.

The LLC resonant converter topology comprises a resonant tank circuit formed by a series inductor, series capacitor, and magnetizing inductance of the transformer. The resonant tank parameters are selected to achieve zero voltage switching (ZVS) for the primary side switches and zero current switching (ZCS) for the secondary side rectifier diodes over the operating frequency range. The primary side full-bridge switches operate above the resonant frequency to achieve ZVS turn-on, while the secondary side rectifier diodes achieve ZCS turn-off when the resonant current naturally reaches zero. The LLC topology provides voltage regulation through frequency modulation, with higher frequencies producing lower output voltage and lower frequencies producing higher output voltage within the soft switching range.

The CLLC or CLLLC resonant converter includes an additional series capacitor on the other side of the transformer to provide bidirectional power flow capability. The series inductor and series capacitor on both sides of the transformer and the magnetizing inductance of the transformer for a CLLLC network providing provides additional resonant paths that extend the ZVS operating range and improve voltage gain characteristics at light loads. The CLLLC topology enables operation below the series resonant frequency while maintaining soft switching, providing greater control flexibility compared to LLC converters.

The dual active bridge converter employs phase-shift modulation between the primary and secondary side full-bridge circuits to control power flow through the transformer leakage inductance. The phase-shift angle between primary and secondary bridges determines the power transfer direction and magnitude. The primary bridge operates at a fixed frequency typically between tens of kHz to hundreds of kHz, while the secondary bridge operates at the same frequency with a controllable phase shift. ZVS is achieved by ensuring that the circulating current through the transformer leakage inductance provides sufficient energy to discharge the switch output capacitances before turn-on. Power flow direction is controlled by the polarity of the phase shift, with positive phase shift transferring power from primary to secondary and negative phase shift enabling reverse power flow.

Multi-active bridge converters extend this concept by incorporating multiple secondary windings with independent phase-shift control, enabling multiple isolated outputs with individual power flow regulation. Each secondary winding has its own full-bridge circuit with independent phase-shift control relative to the primary bridge. The multi-active bridge configuration enables individual control of power flow to each output port while maintaining galvanic isolation between all ports. The phase-shift control for each secondary bridge operates independently, allowing different power levels and even different power flow directions for each output port.

The quasi-resonant dual active bridge combines phase-shift modulation with resonant tank elements to achieve soft switching over extended operating ranges while maintaining the controllability of phase-shift modulation. The resonant elements create sinusoidal current and voltage waveforms that enable ZVS over a wider range of load conditions compared to conventional DAB converters.

Soft Switching Operation

The power semiconductor devices in the two quadrant switches include IGBTs, MOSFETs, Silicon Carbide devices, or Gallium Nitride devices. These semiconductor devices operate at the medium to high frequencies to enable soft switching operation over a wide operating range, thereby achieving high efficiency. The modules are implemented using two-level, three-level, or multi-level topology configurations depending on the voltage and power requirements. Half-bridge topologies are also used in the module implementations.

Soft switching operation is achieved through careful timing of switch transitions relative to the resonant current and voltage waveforms in the converter. Zero voltage switching (ZVS) occurs when the switch voltage reaches zero before the switch is turned on, eliminating turn-on switching losses and reducing electromagnetic interference. The ZVS condition is maintained by ensuring that the resonant current provides sufficient energy to discharge the switch output capacitance before the next switching transition. For LLC resonant converters, ZVS is achieved by operating above the resonant frequency where the primary current leads the primary voltage, creating inductive current flow that discharges the switch capacitances. For DAB converters, ZVS is achieved by maintaining sufficient circulating current through the transformer leakage inductance during the dead time between complementary switch transitions.

Zero current switching (ZCS) occurs when the switch current reaches zero before the switch is turned off, eliminating turn-off switching losses. The operating frequency range for maintaining soft switching typically spans from 80% to 120% of the resonant frequency, with the exact range depending on the load conditions and resonant tank parameters. For LLC converters, the soft switching range extends from the series resonant frequency $fr=1/(2\pi\sqrt{(Lr\times Cr)})$ to approximately $1.2\times fr$, where operation above fr maintains ZVS for primary switches and ZCS for secondary diodes. Load variations affect the soft switching range, with lighter loads requiring higher frequencies to maintain ZVS conditions.

The switching transitions in soft switching operation follow predictable patterns that minimize switching stress on the semiconductor devices. During ZVS turn-on transitions, the switch voltage naturally decreases to zero due to the resonant current flow, allowing the switch to turn on with minimal switching loss. The dead time between complementary switches in the same leg is adjusted to ensure complete discharge of the switch output capacitance before turn-on. Typical dead times range from 100 ns to 500 ns depending on the switch output capacitance and available discharge current. During ZCS turn-off transitions, the resonant current naturally decreases to zero, allowing the switch to turn off with minimal switching loss and reduced voltage stress. The soft switching operation extends over wide operating ranges by maintaining appropriate relationships between switching frequency, resonant frequency, and load conditions through adaptive frequency control algorithms that monitor the switch voltage and current waveforms to ensure optimal switching conditions.

Filter Implementations

DC blocking capacitors are used on either side or both sides of the transformer to prevent DC current flow through the transformer windings and ensure proper magnetic flux operation. Filter components such as inductors are used in addition to the DC bus capacitors on both the low voltage and medium voltage ports to reduce current ripple and provide stable voltage regulation. The single-phase modules have one or more windings on the low voltage side of the transformer to provide multiple low voltage ports when required for specific applications.

Lumped common mode and differential mode filters can be used at the medium voltage AC port comprise specific filter topologies designed to suppress electromagnetic interference and improve power quality.

Distributed filters inside modules provide an alternative filtering approach where filtering components are integrated within each individual module rather than using centralized lumped filters. The distributed filter design considerations include impedance matching between modules, resonance avoidance across the cascaded configuration, and coordination of filter cutoff frequencies to achieve overall system electromagnetic compatibility requirements.

Figure 2:
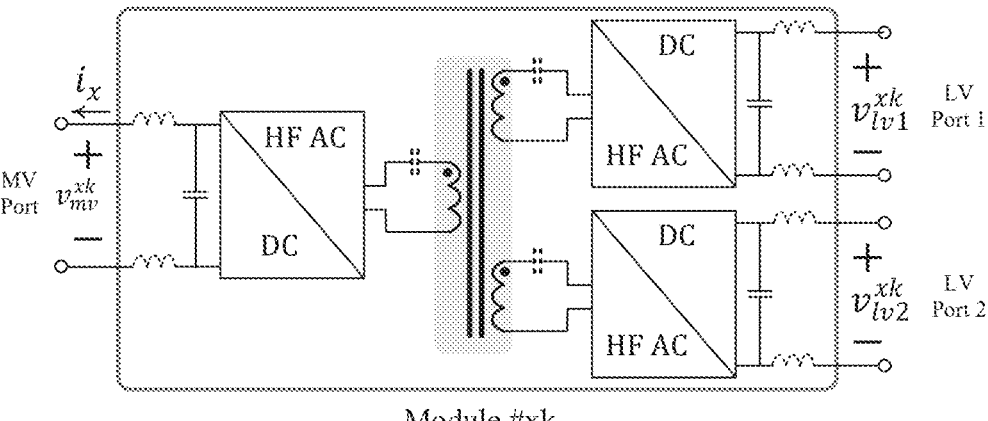
FIG. 2 depicts a schematic diagram of the single-phase module of FIG. 1 with two low voltage ports, according to aspects of the present disclosure.

Referring to FIG. 2, a single-phase module configuration includes two low voltage ports to provide enhanced flexibility in voltage and power distribution. The medium voltage port connects through an inductor to a DC bus capacitor and an HF AC conversion block, similar to the single-port configuration. The inductor provides current filtering and voltage regulation for the medium voltage side of the module.

The medium-frequency transformer in this configuration includes multiple windings on the low voltage side to accommodate the two separate output ports. The transformer design incorporates a primary winding connected to the medium voltage side HF AC conversion block and two secondary windings that enable independent voltage transformation for each low voltage port. The multiple windings on the low voltage side enable the transformer to provide different voltage levels and power ratings at each output port according to the winding turns ratios.

Two independent HF AC conversion blocks connect to the respective secondary windings of the transformer. Each HF AC conversion block operates independently to convert the high-frequency AC voltage from its corresponding secondary winding to DC voltage for its associated low voltage port. The independent operation of the conversion blocks allows for different control strategies and power flow management at each low voltage port.

Each low voltage port includes its own DC bus configuration with dedicated filtering arrangements. The first low voltage port connects to an upper HF AC conversion block and includes positive and negative terminals with associated inductors and capacitors for voltage smoothing and current filtering. The second low voltage port connects to a lower HF AC conversion block and similarly includes positive and negative terminals with its own set of filtering components. The separate DC bus configurations enable independent voltage regulation and current control at each low voltage port.

The low voltage ports of the modules are interconnected to form a low voltage DC interface through series and parallel connection combinations. The series connection of low voltage ports increases the total output voltage, while parallel connection increases the total output current capacity. The interconnection arrangements enable the solid-state transformer system to reach required voltage and power levels by combining outputs from multiple single-phase modules with dual low voltage ports.

Specific examples of series and parallel low voltage port combinations demonstrate the voltage and current scaling capabilities of the modular architecture. In a series configuration with four modules each providing 400V at 100 A per low voltage port, the series connection of all low voltage ports produces 1600V at 100 A, achieving voltage scaling by a factor of four. In a parallel configuration with the same four modules, the parallel connection of all low voltage ports produces 400V at 400 A, achieving current scaling by a factor of four. Mixed series-parallel configurations enable intermediate voltage and current levels, such as connecting two modules in series to produce 800V at 100 A, then connecting two such series strings in parallel to achieve 800V at 200 A.

The voltage and current relationships in series and parallel low voltage port configurations follow fundamental electrical principles while accounting for the isolated nature of each module. Series-connected low voltage ports require current balancing to ensure equal current flow through each module, achieved through matched impedance characteristics and coordinated control of the individual modules. Parallel-connected low voltage ports require voltage balancing to ensure equal voltage across each module, achieved through synchronized voltage regulation and load sharing control algorithms. The isolated DC-DC converter topology within each module enables flexible series and parallel combinations without ground loop issues or common mode interference between modules.

The multiple winding configuration on the low voltage side provides design flexibility for applications requiring different voltage levels or isolated power supplies. The transformer windings are designed with appropriate turns ratios to achieve the desired voltage transformation for each low voltage port. The independent nature of the two low voltage ports allows for simultaneous operation at different voltage levels and power ratings within the same single-phase module.

Three-Phase Module Variants

Figure 3:
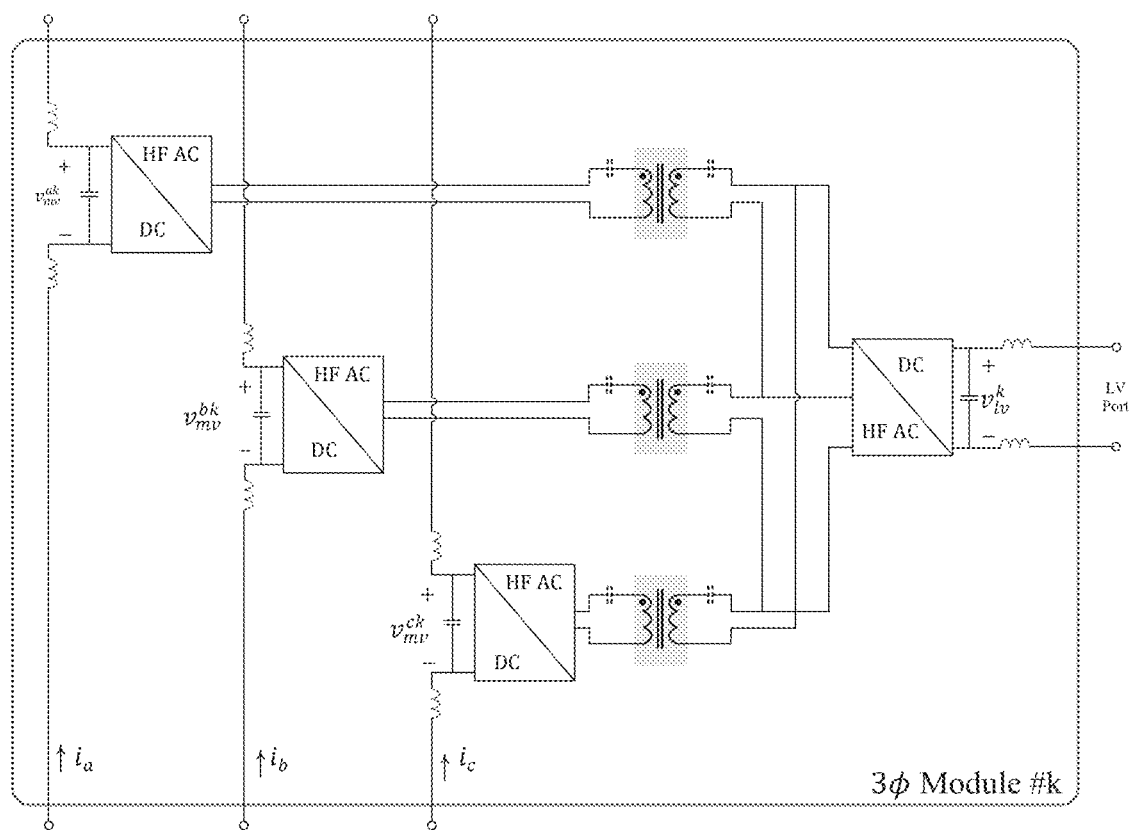
FIG. 3 depicts a schematic diagram of a three-phase module for a cascaded DC modular solid-state transformer, according to aspects of the present disclosure.

Referring to FIG. 3, three-phase modules are implemented as integrated three-phase modules with delta-connected low voltage side windings. The integrated three-phase module configuration integrates three DC-DC converters to construct a single three-phase module unit. The low voltage side windings of the three transformers within the integrated module are delta-connected and fed by a single HFAC/DC block for each low voltage output port. Each transformer can include more than one winding on the LV side to provide the necessary number of LV ports. In topologies, where AC ports are needed on both MV and LV sides (e.g., MVAC/LVAC, MVAC/LVAC/LVDC, MVAC/MVDC/LVAC, MVAC/MVDC/LVDC/LVAC), a three-phase module consists of at least three MV facing ports and at least three LV facing ports.

The delta-connected low voltage side windings impose a duty ratio constraint on the operation of the integrated three-phase modules. The constraint limits the combined duty ratio of the three high-frequency AC voltages applied on the low voltage side windings of the transformer such that $da+db+dc \leq 2$, where da, db, and dc represent the duty ratios for phases a, b, and c respectively. This constraint arises from the delta connection configuration and affects the maximum achievable voltage utilization in the integrated three-phase module topology.

Figure 4:
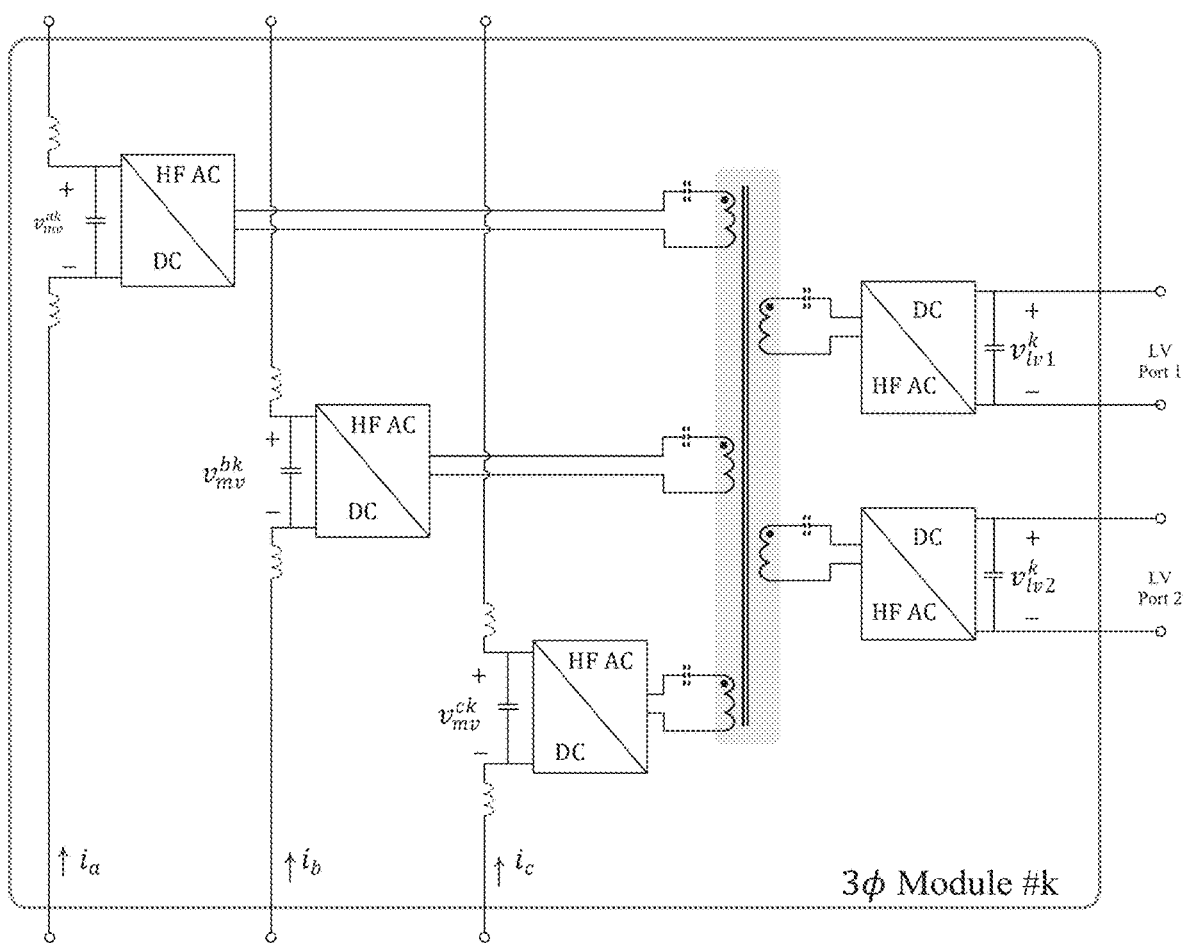
FIG. 4 depicts a schematic diagram of the three-phase module of FIG. 3 with two low voltage ports, according to aspects of the present disclosure.

Referring to FIG. 4, the magnetically coupled three-phase modules comprise a common core configuration, where the magnetic flux from all three phases are combined. One or more windings are used on the LV side to obtain desired number of LV ports. In topologies, where AC ports are needed on both MV and LV sides (e.g., MVAC/LVAC, MVAC/LVAC/LVDC, MVAC/MVDC/LVAC, MVAC/MVDC/LVDC/LVAC), a three-phase module consists of at least three MV facing ports and at least three LV facing ports.

The magnetically coupled three-phase modules on a common core structure result in constant total flux excitation. A balanced three-phase operation results in the vector sum of the three phase fluxes equaling zero at any instant, eliminating the double-line frequency flux variations that occur in single-phase transformers. The constant flux excitation reduces core losses by eliminating hysteresis losses associated with flux reversals and reduces eddy current losses by maintaining steady-state flux density levels.

The magnetically coupled three-phase modules provide constant power flow over the transformer core by combining the double-line frequency oscillating single-phase power from the three grid phases on the medium voltage side of the transformer core. This constant power excitation results in reduced core losses and winding losses in the transformer compared to single-phase modules that experience pulsating power flow. The constant power flow also reduces current stress and losses in the low voltage side busbars and power devices.

The transformer cores in the magnetically coupled three-phase modules experience reduced magnetic flux variations due to the balanced three-phase power flow. The reduced flux variations lead to lower core losses and improved transformer efficiency compared to single-phase modules where the transformer core experiences significant flux variations at twice the line frequency. The low voltage side windings also experience reduced current stress due to the constant power flow, resulting in lower winding losses and improved thermal performance.

Referring to FIG. 4, a three-terminal solid-state transformer system utilizes three-phase modules arranged in a cascaded configuration with upper and lower arm modules in each phase of a three-phase AC grid. The system comprises three vertical columns representing phases a, b, and c of the AC grid, with each phase containing an upper arm and a lower arm configuration. Each arm consists of cascaded modules that include HF AC conversion blocks and DC conversion blocks, along with medium-frequency transformers for galvanic isolation.

The modules in each arm are series-connected on their medium voltage sides to enable voltage scaling across the medium voltage range. The cascaded arrangement distributes the medium voltage across multiple modules, allowing each individual module to operate at lower voltage levels while the overall system handles medium voltage AC levels. The HF AC conversion blocks in each module operate at frequencies between 20 kHz and 100 kHz using two quadrant switches on both the medium voltage and low voltage sides.

A medium voltage DC interface is formed through the interconnection of the uppermost and lowermost modules across all three phases. The DC positive terminals of the uppermost modules from all three phases are tied together at point P, while the DC negative terminals of the lowermost modules from all three phases are tied together at point N. The connection between points P and N creates the medium voltage DC port that enables bidirectional DC power flow at medium voltage levels.

The three-phase medium voltage AC interface is formed at the junctions between the upper and lower arms of each phase. These junction points provide the connection points for the three-phase AC grid, enabling the system to interface with medium voltage AC power systems. The series connection of modules in each arm enables the system to handle the full medium voltage AC levels by distributing the instantaneous AC voltages across the cascaded modules in each arm.

The low voltage ports from all modules are interconnected to form two separate low voltage DC output ports. The first low voltage DC port is formed by connecting the low voltage outputs from a first set of transformer windings across all modules, while the second low voltage DC port is formed by connecting the low voltage outputs from a second set of transformer windings. The interconnection of the low voltage ports enables the system to provide multiple isolated DC outputs at low voltage levels while maintaining galvanic isolation from the medium voltage sides.

The three-phase modules are implemented as magnetically coupled three-phase modules that eliminate the duty ratio constraint present in integrated three-phase modules. The magnetically coupled configuration removes the limitation where the combined duty ratio of the three high-frequency AC voltages is constrained to da+db+dc≤2. The elimination of this constraint provides greater operational flexibility and enables higher voltage utilization compared to delta-connected integrated three-phase modules.

Figure 5:
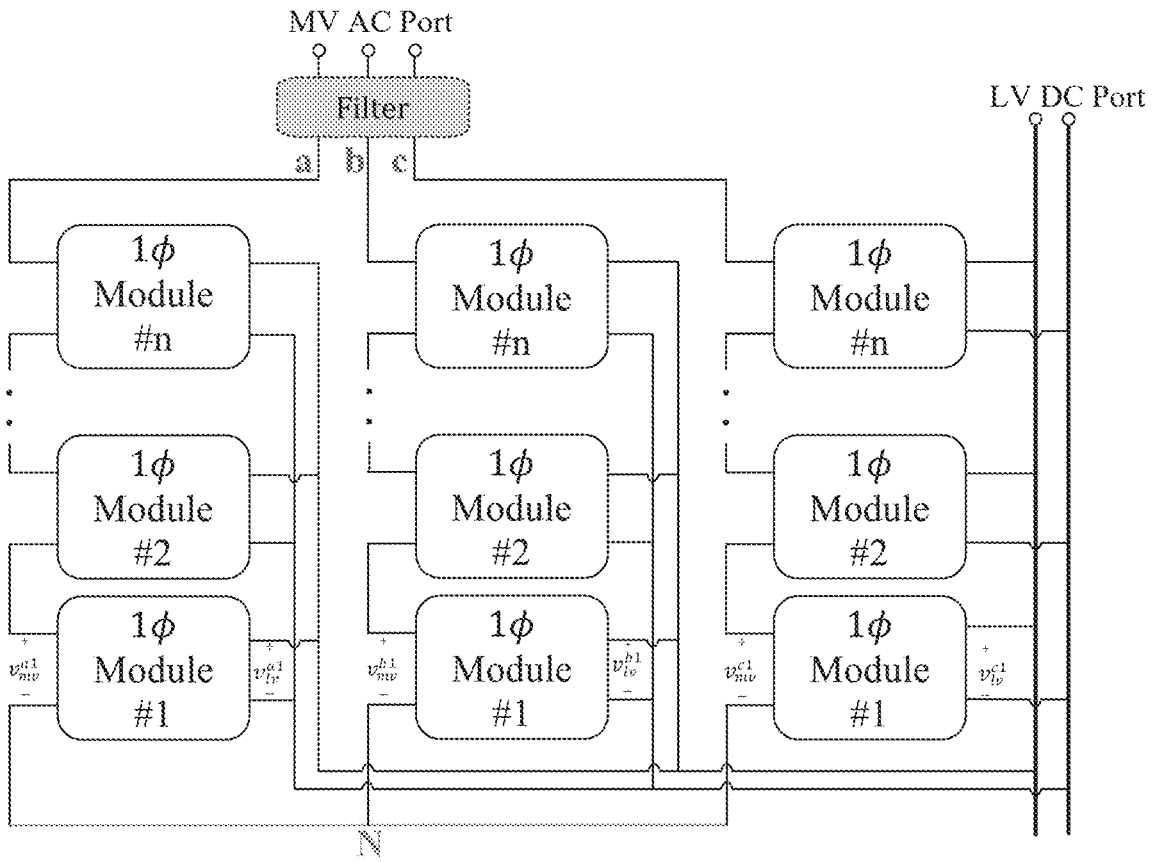
FIG. 5 depicts a two-terminal solid-state transformer architecture utilizing single-phase modules in a cascaded configuration for MVAC to LVDC conversion, according to aspects of the present disclosure.

Referring to FIG. 5, a two-terminal solid-state transformer architecture utilizes single-phase modules arranged in a cascaded configuration for medium voltage AC to low voltage DC conversion. The architecture comprises three vertical columns representing phases a, b, and c of the AC grid, with each column containing multiple single-phase modules stacked in series configuration. Each single-phase module is labeled sequentially as "1φ Module 1," "1φ Module 2," and "1φ Module n," where n indicates the last module in the series connection within each phase column.

An MVAC port is positioned at the top of the diagram and connects through an optional filter component to three terminals that interface with the three-phase AC grid. The filter component provides filtering functionality for the medium voltage AC interface and connects to the uppermost modules in each of the three phase columns. The MVAC port enables the solid-state transformer system to interface with medium voltage AC power systems while the filter component manages power quality and electromagnetic interference.

The medium voltage ports of the modules are series-connected in each phase of the three-phase configuration to form a medium voltage AC interface. Within each phase column, the medium voltage ports of consecutive modules connect in series to distribute the total phase voltage across all modules in that column. The series connection enables each individual module to operate at a fraction of the total medium voltage while the combined modules handle the full medium voltage AC levels present at the MVAC port.

A Y configuration is formed by connecting the medium voltage ports of first modules in each phase together at a common node labeled "N." The bottom modules of all three phases converge at this neutral node N, creating the neutral point of the Y-connected configuration. The Y configuration provides a reference point for the three-phase system.

The medium voltage AC interface is formed by DC positive terminals of n-th modules in each phase constituting a three-phase three-wire terminal. The uppermost modules in each phase column provide the three-phase connection points that interface with the AC grid through the filter component. The DC positive terminals of these n-th modules form the line terminals of the three-phase three-wire system, while the neutral node N provides the reference point for the Y-connected configuration.

The low voltage ports of the modules are interconnected to form a low voltage DC interface through horizontal bus connections that run across all three phase columns. These horizontal bus connections interconnect all modules' low voltage ports to a common LVDC output port positioned on the right side of the architecture. The interconnection enables power from all modules to be combined and delivered through the single low voltage DC interface.

The low voltage ports are connected in series and parallel combinations to reach required voltage and power levels for the specific application requirements. Series connection of low voltage ports increases the total output voltage of the low voltage DC interface, while parallel connection increases the total current capacity and power handling capability. The combination of series and parallel connections enables the system to achieve the desired voltage and power specifications at the low voltage DC interface.

Lumped common mode and differential mode filters are used at the medium voltage AC port to provide electromagnetic interference suppression and power quality improvement. The lumped filters are positioned between the MVAC port and the series-connected modules to filter common mode currents and differential mode harmonics that arise from the high-frequency switching operation of the modules. The common mode filters suppress currents that flow in the same direction in all three phases, while the differential mode filters suppress currents that flow between phases.

Distributed filters inside modules are used as an alternative to lumped filters at the medium voltage AC port. The distributed filtering approach incorporates filtering components within each individual module rather than using centralized lumped filters. The distributed filters provide localized filtering at each module level, which reduces the overall filter requirements and enables more compact system design while maintaining electromagnetic compatibility and power quality performance.

Start-Up and Protection

Start-up sequences for the cascaded modular solid-state transformer system address the challenge of initializing multiple series-connected modules without excessive inrush currents or voltage imbalances. The start-up sequence begins with pre-charging the medium voltage DC bus capacitors in each module through controlled current injection from the low voltage DC interface.

Fault protection strategies for the cascaded modular architecture include individual module protection, cascaded system protection, and coordination between protection levels. Individual module protection comprises overcurrent protection with current sensors monitoring both medium voltage and low voltage ports, overvoltage protection with voltage sensors monitoring DC bus voltages, and overtemperature protection with thermal sensors monitoring semiconductor junction temperatures and magnetic component temperatures. Cascaded system protection includes differential protection comparing currents entering and leaving each phase column, ground fault protection monitoring common mode currents, and arc fault protection detecting high-frequency current signatures indicative of arcing conditions. Protection coordination ensures that faults are isolated at the lowest possible level while maintaining system operation, with communication between module controllers and system controllers enabling rapid fault detection and isolation.

Figure 6:
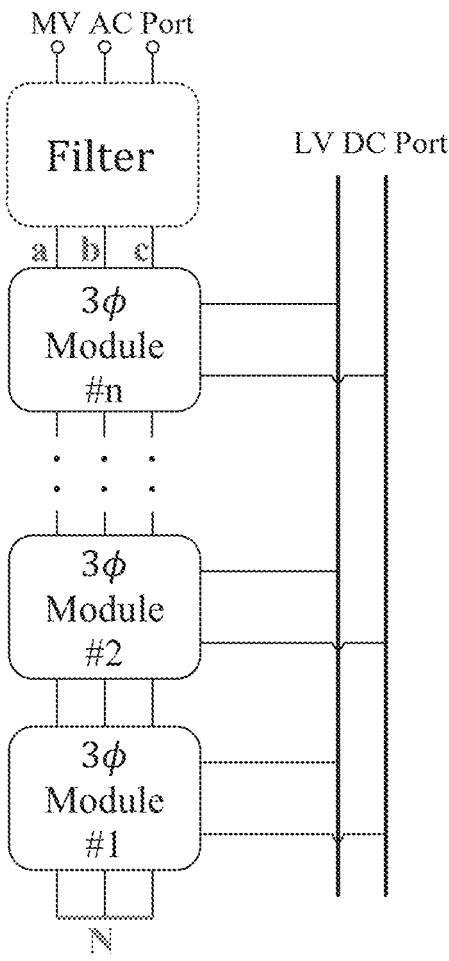
FIG. 6 depicts a two-terminal solid-state transformer architecture utilizing the three-phase modules in a cascaded configuration for MVAC to LVDC conversion, according to aspects of the present disclosure.

Referring to FIG. 6, a two-terminal solid-state transformer architecture utilizes three-phase modules arranged in a cascaded configuration for medium voltage AC to low voltage DC conversion. The architecture comprises n identical three-phase modules labeled as "3φ Module 1," "3φ Module 2," up to "3φ Module n" that are stacked vertically in series connection on their medium voltage sides. Each three-phase module is represented as a rounded rectangular block that contains the integrated power conversion circuitry, similar to the modules shown in FIG. 3 or FIG. 4, for processing three-phase power.

A filter block is positioned at the top of the cascaded arrangement and connects to the MV AC Port through three input connections representing the medium voltage alternating current interface. The filter block provides electromagnetic interference suppression and power quality management for the three-phase AC interface. The filter connects to the uppermost three-phase module in the cascaded stack through three parallel connection lines that represent the three-phase AC connections.

The medium voltage ports of the modules are series-connected in each phase of the three-phase configuration to form a medium voltage AC interface. The series connection of the three-phase modules distributes the total medium voltage across the cascaded modules, enabling each individual module to operate at a fraction of the total medium voltage while the combined modules handle the full medium voltage AC levels. The three parallel lines between consecutive modules represent the three-phase connections that maintain the series configuration across all three phases simultaneously.

A neutral point N is formed where DC negative terminals of first modules in all three grid phases are tied together to create a Y configuration. The neutral point N appears at the bottom of the cascaded stack and provides the reference point for the Y-connected three-phase system.

The medium voltage AC interface is formed by three-phase AC connections at the DC positive terminals of the uppermost modules constituting a three-phase three-wire terminal. Red connection points are visible at the top of the uppermost module, indicating the AC phase connections for terminals a, b, and c that interface with the three-phase AC grid through the filter block. These connection points form the line terminals of the three-phase system while the neutral point N provides the neutral reference.

The low voltage DC outputs from all modules are connected to vertical bus bars that form a single LV DC Port positioned on the right side of the architecture. The parallel connection of LV DC outputs from all three-phase modules combines the power from each module to deliver the total power through the single low voltage DC interface. The vertical bus bars enable the low voltage ports of all modules to be interconnected in parallel configuration to increase the total current capacity and power handling capability.

The cascaded arrangement enables voltage scaling on both the medium voltage and low voltage sides of the solid-state transformer system. On the medium voltage side, the series connection of three-phase modules distributes the medium voltage AC levels across multiple modules, allowing each module to operate at lower voltage stress while the overall system handles the full medium voltage range. On the low voltage side, the parallel connection of module outputs enables current scaling and power combining to achieve the required low voltage DC specifications.

The three-phase modules in the cascaded configuration operate as integrated units that process three-phase power, resulting in reduced current stress and improved efficiency compared to single-phase module arrangements. The integrated three-phase operation eliminates the double-line frequency power pulsations that occur in single-phase modules, leading to reduced component stress and improved power quality at both the medium voltage AC interface and the low voltage DC interface.

The vertical stacking arrangement of three-phase modules provides a compact system configuration that minimizes the interconnection complexity between modules while maintaining the series connection on the medium voltage side and parallel connection on the low voltage side. The modular architecture enables scalability by adding or removing three-phase modules from the cascaded stack to adjust the voltage and power ratings according to specific application requirements.

Figure 7:
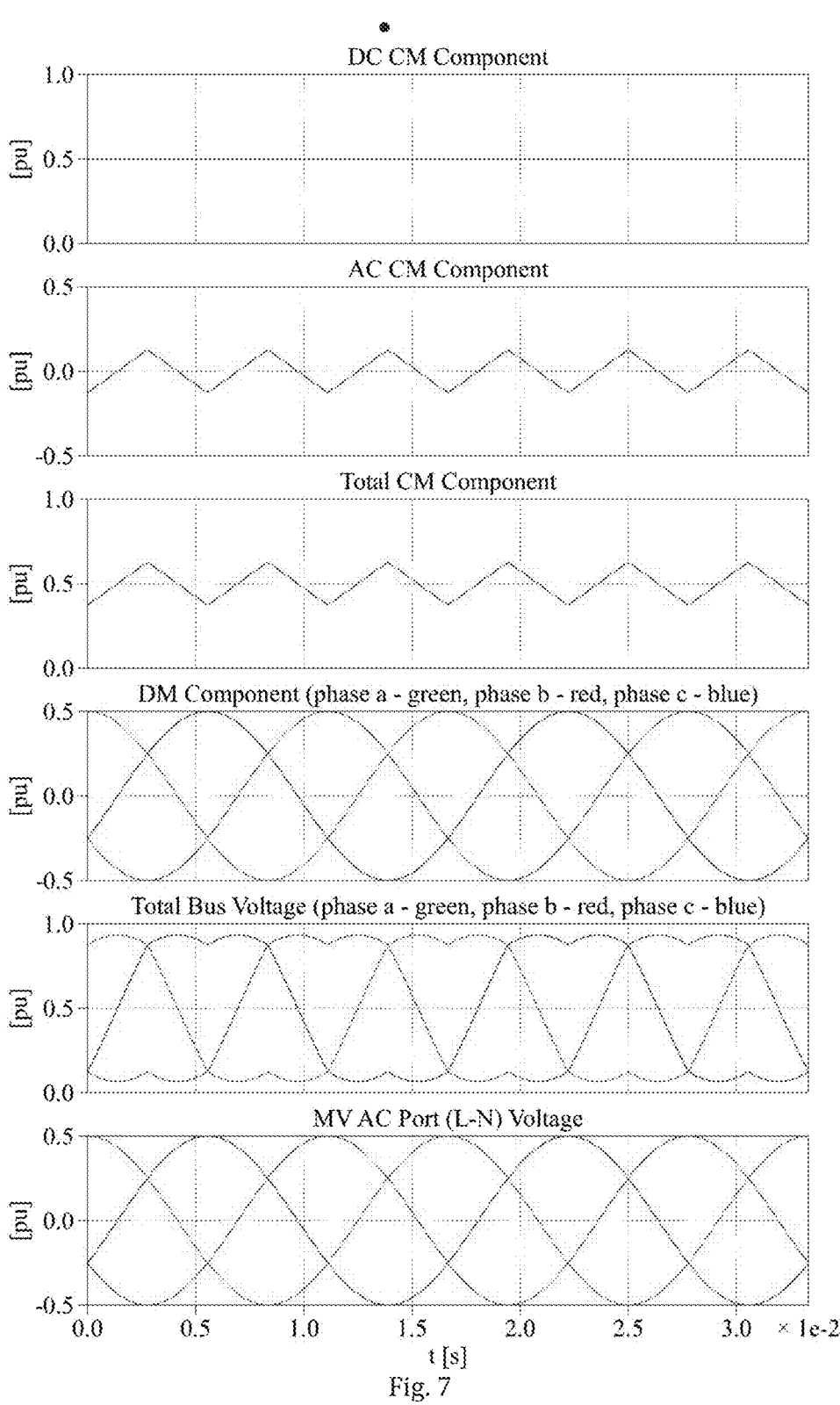
FIG. 7 presents time-domain waveform plots illustrating voltage characteristics of the cascaded DC modular solid-state transformer system, according to aspects of the present disclosure.

Referring to FIG. 7, the voltage and current waveforms illustrate the composition and characteristics of voltage references generated by a controller for controlling the cascaded modular solid-state transformer systems shown in FIG. 5 and FIG. 6. The controller is configured to generate voltage references for each module, where the voltage references comprise a DC common-mode component and an AC differential-mode component, and optionally an AC common-mode component. The six time-domain waveform plots demonstrate how these voltage components combine to achieve unipolar voltage operation across the medium voltage port of each module.

The top plot shows the DC common-mode component maintaining a constant value near 0.5 per unit throughout the time period. This DC common-mode component provides the baseline voltage level that ensures the total bus voltage remains unipolar despite the AC variations imposed by the grid connection. The constant nature of the DC common-mode component establishes the reference level around which the AC components oscillate.

The second plot displays the AC common-mode component oscillating at third order harmonic frequencies centered around zero. The controller generates an AC common-mode component using third-harmonic injection to maximize bus voltage utilization. The third-harmonic injection strategy creates the AC common-mode component that provides additional voltage utilization capability while maintaining the constraint that the AC common-mode component does not contribute to power flow at the medium voltage AC interface.

The third plot shows the total common-mode component, which combines the DC and AC components, resulting in a waveform that oscillates around 0.5 per unit. The total common-mode component represents the sum of the DC common-mode component and the AC common-mode component, demonstrating how these components are combined to form the common-mode portion of the voltage reference for each module.

The fourth plot presents the differential-mode component with three sinusoidal waveforms in different colors representing phases a, b, and c oscillating between +0.5 and –0.5 per unit with 120-degree phase displacement. The AC differential-mode component carries the power flow information and represents the three-phase AC voltages that interface with the medium voltage AC grid.

The fifth plot shows the total bus voltage for all three phases, displaying three waveforms that remain entirely positive, demonstrating unipolar voltage operation. The total bus voltage represents the complete voltage reference that combines all components and demonstrates how the DC common-mode component ensures unipolar voltage operation across the medium voltage port of each module while connected to a three-phase AC source.

The bottom plot illustrates the phase voltages at the three-phase three-wire MV AC port, which are three phase-shifted sinusoidal waveforms oscillating symmetrically between +0.5 and –0.5 per unit. These waveforms represent the actual AC voltages present at the medium voltage AC interface after the common-mode components are eliminated through the Y-connected configuration of the modules.

The voltage references vmv^xk are constructed by combining a DC common-mode component vcmdc^xk, an AC common-mode component vcmac^xk, and an AC differential-mode component vdm^xk, where x indicates the grid phase a, b, or c, and k denotes the module number. The method of controlling a cascaded DC modular solid-state transformer comprises generating voltage references for medium voltage buses of the modules by combining a DC common-mode voltage component, an AC optional common-mode voltage component, and an AC differential-mode voltage component.

The DC common-mode component ensures unipolar voltage vmv^xk(t) across the MV bus despite connecting to a three-phase AC source by providing a sufficient positive offset that prevents the total voltage reference from becoming negative during any portion of the AC cycle. The method comprises regulating the DC common-mode voltage component to ensure unipolar voltage operation across the medium voltage port of each module while connected to a three-phase AC source.

The AC common-mode component does not affect power flow at the medium voltage AC interface because the common-mode voltages are eliminated at the differential three-wire connection through the Y-connected configuration of the modules. The AC common-mode voltage component is generated using third-harmonic injection to maximize bus voltage utilization, and the AC common-mode voltage component does not affect power flow at the medium voltage AC interface due to the differential nature of the three-phase AC connection.

Figure 8:
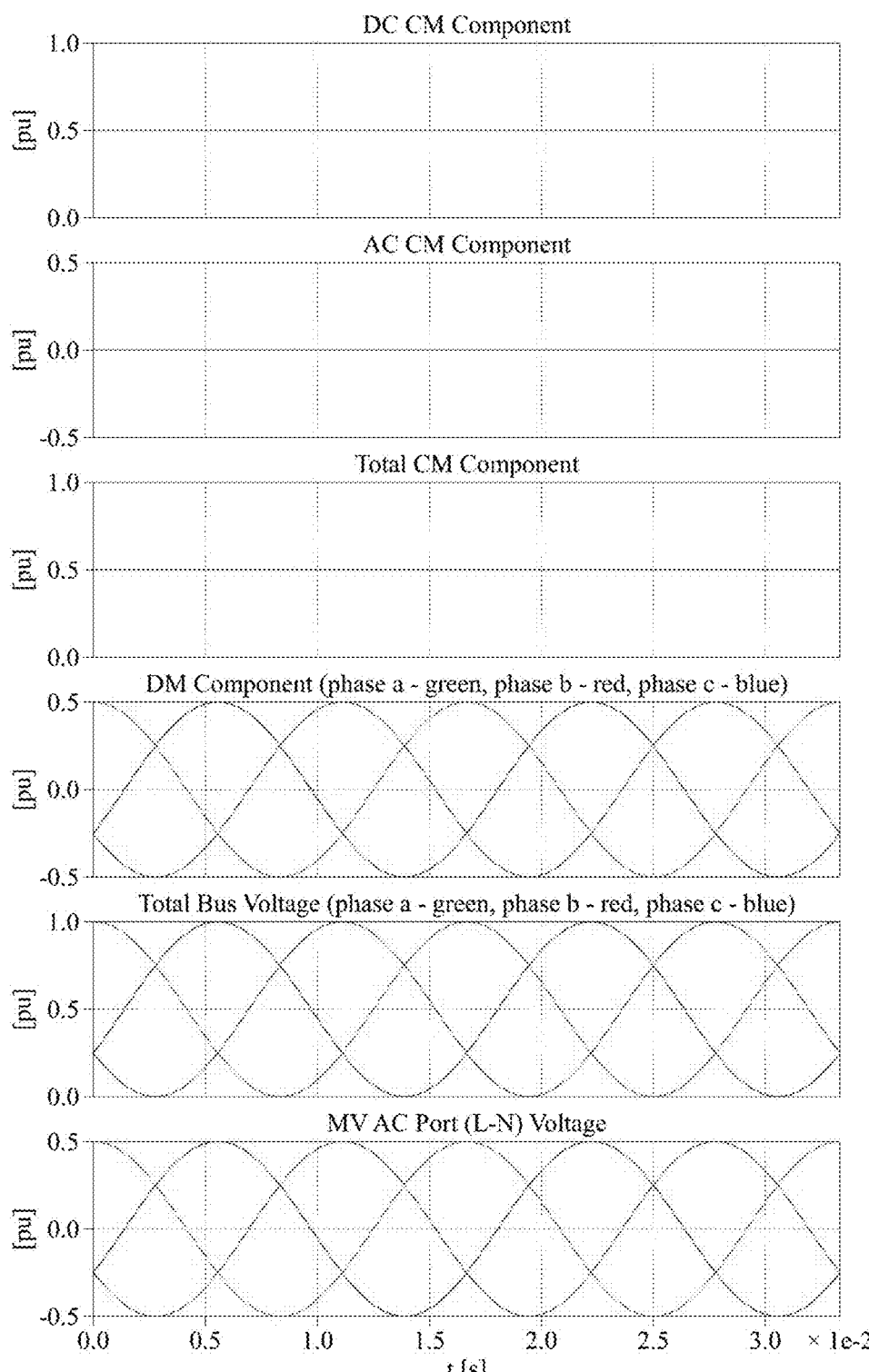
FIG. 8 presents time-domain plots showing electrical waveforms for voltage composition and transformation characteristics, according to aspects of the present disclosure.

Referring to FIG. 8, when the AC common-mode component is set to zero, the DC common-mode component can still ensure unipolar voltage operation across the medium voltage port of each module. Hence, the AC common-mode component is optional for the operation of a cascaded DC modular SST.

The zero AC common-mode mode offers simplified control implementation by eliminating the need for third-harmonic generation and injection circuitry. However, this simplification comes at the cost of reduced voltage utilization. The choice between using third-harmonic injection (FIG. 7) and zero AC common-mode operation (FIG. 8) represents a design trade-off between control complexity and component voltage ratings. Applications requiring maximum voltage utilization and minimum component cost benefit from third-harmonic injection, while applications prioritizing control simplicity and reduced computational requirements may opt for zero AC common-mode operation.

In both operating modes shown in FIG. 7 and FIG. 8, the total bus voltage for all three phases remains entirely positive, demonstrating successful unipolar voltage operation. The MV AC port line-to-neutral voltage in both cases exhibits balanced three-phase sinusoidal waveforms oscillating symmetrically between +0.5 and –0.5 per unit, confirming that the common-mode voltage components do not affect the AC interface voltage due to the differential nature of the Y-connected three-phase configuration.

Figure 9:
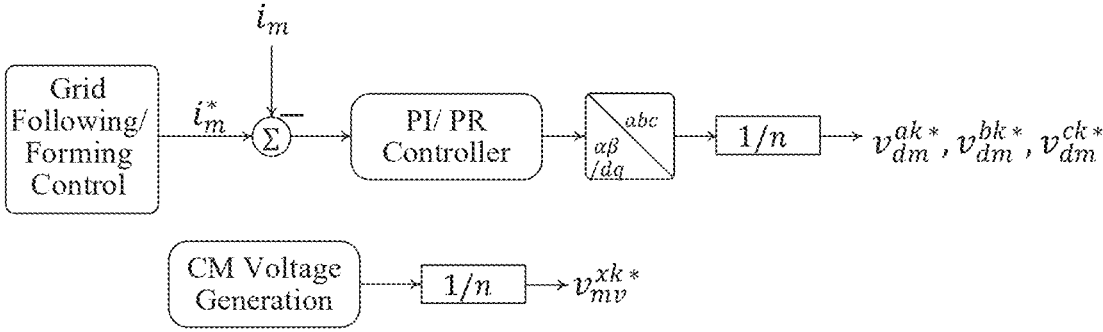
FIG. 9 depicts a control system block diagram for a grid-following or forming control architecture, according to aspects of the present disclosure.

Referring to FIG. 9, a higher-level control structure for the two-terminal solid-state transformer, shown in FIG. 5 and FIG. 6, system comprises a hierarchical control architecture with multiple cascaded control loops. The control structure includes a grid following/forming control block that generates appropriate control signals for the solid-state transformer system. The grid following/forming control block implements control algorithms that enable the system to either follow an existing grid voltage or form a grid voltage reference depending on the operational mode requirements.

The grid following/forming control block outputs a current reference im^*, a three phase differential mode vector in synchronous or stationary reference frame, that represents the desired current flow through the MV AC port of the solid-state transformer system. The current reference im^* is generated based on the specific control objectives of the system, whether operating in grid-following mode to track an existing grid or in grid-forming mode to establish grid voltage characteristics. The current reference generation incorporates the power flow requirements and voltage regulation objectives of the solid-state transformer system.

A summation junction compares the current reference with actual current feedback to generate an error signal for the control system. The summation junction receives the current reference from the grid following/forming control block and subtracts the measured actual current feedback to produce a current error signal. The current error signal represents the difference between the desired current flow and the actual current flow through the solid-state transformer system, providing the basis for closed-loop current regulation.

A proportional-integral (PI) or proportional-resonant (PR) controller block processes the current error signal from the summation junction and generates voltage references for the solid-state transformer modules. The PI/PR controller block implements proportional-integral or proportional-resonant control algorithms to minimize the current error and achieve accurate current tracking. The controller generates voltage references that are distributed to the individual modules to achieve the desired current flow through the system.

The voltage references from the PI/PR controller are processed through I/Ij blocks that distribute the control signals to multiple modules or phases within the solid-state transformer system. The 1/n blocks perform distribution or normalization functions to ensure that each module receives appropriate voltage reference signals based on its position and role within the cascaded configuration. The distribution blocks enable the centralized control signals to be appropriately scaled and distributed among the multiple modules in the system.

Three parallel blocks labeled with 1/n symbols receive the distributed voltage references and provide individual control signals to respective modules or phases. These parallel distribution blocks ensure that each module in the cascaded configuration receives properly scaled voltage references that account for the module's contribution to the overall system operation. The parallel distribution enables simultaneous control of multiple modules while maintaining coordination between the modules.

A separate common-mode voltage generation block operates independently from the main control path and generates common-mode voltage references for the system. The common-mode voltage generation block creates the DC common-mode and AC common-mode voltage components that are combined with the differential-mode voltage references to form the complete voltage references for each module. The common-mode voltage generation block feeds through an 1/n block to three parallel outputs, indicating common-mode voltage generation and distribution to all modules in the system.

The hierarchical control structure implements cascaded control loops that include droop control or virtual synchronous generator control for grid forming applications. The cascaded droop control provides frequency and voltage regulation characteristics that mimic synchronous generators, enabling the solid-state transformer system to participate in grid frequency and voltage regulation. Virtual synchronous generator control algorithms provide inertial response and damping characteristics that enhance grid stability and power quality.

The control structure incorporates virtual admittance or impedance control loops that shape the electrical characteristics of the solid-state transformer system as seen from the grid connection point. Virtual admittance control enables the system to present desired impedance characteristics to the grid, providing flexibility in power flow control and grid interaction. The virtual impedance control loops operate in coordination with the current control loops to achieve the desired electrical behavior.

Current control loops within the hierarchical structure provide fast dynamic response for current regulation and power flow control. The current control loops operate at higher bandwidth compared to the outer voltage and power control loops, enabling rapid response to transient conditions and disturbances. The current control loops receive references from higher-level control layers and generate voltage references that are distributed among the series-connected modules.

Control Implementation

The control action is performed by a centralized controller or in a distributed fashion by a collection of digital controllers. A centralized controller implementation performs all higher-level control layers in a single processing unit, while distributed control implementations divide the control functions among multiple digital controllers. The distributed approach enables module controllers to implement voltage controllers and modulators locally while a central controller performs higher-level control layers.

Linear or non-linear control strategies are used instead of PI/PR controllers for current and voltage control depending on the specific performance requirements and operating conditions. Non-linear control strategies include sliding mode control, model predictive control, or adaptive control algorithms that provide enhanced performance under varying operating conditions. The selection of control strategy depends on factors such as dynamic response requirements, robustness to parameter variations, and computational complexity constraints.

In grid forming applications, the higher-level controller excludes the current control layer and directly generates differential-mode voltage references. The direct generation of differential-mode voltage references eliminates the intermediate current reference generation and current control loop, simplifying the control structure for applications where voltage control is the primary objective. The grid forming mode enables the solid-state transformer system to establish and maintain grid voltage characteristics without requiring current feedback control.

Figure 10:
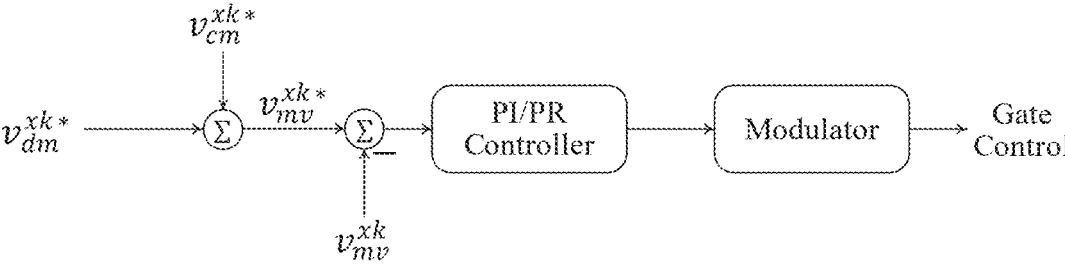
FIG. 10 depicts a control system block diagram for a power electronic converter module, according to aspects of the present disclosure.

Referring to FIG. 10, a module-level voltage controller comprises a control system block diagram for a power electronic converter module that implements voltage regulation at the individual module level within the cascaded solid-state transformer architecture. The voltage controller receives three reference signals marked with asterisks that represent the voltage reference components for the specific module. These three reference signals feed into summation nodes where they are combined to form the complete voltage reference for the module.

The summation nodes compare the voltage reference signals with feedback measurements obtained from the actual module voltages to generate error signals. The feedback measurements represent the actual voltage conditions at the medium voltage port of the module, and the comparison with the reference signals produces error signals that indicate the deviation between desired and actual voltage levels. The error signals provide the basis for closed-loop voltage regulation at the module level.

A PI/PR controller block processes the error signals from the summation nodes and generates control signals for the power conversion hardware. The PI/PR controller block implements proportional-integral or proportional-resonant control algorithms to minimize the voltage error and achieve accurate voltage tracking. The controller processes the error signals and produces control outputs that drive the modulation and switching functions of the module.

A modulator block receives the control signals from the PI/PR controller and generates gate control signals for the semiconductor switches within the module. The modulator block converts the continuous control signals into discrete switching patterns that control the operation of the two quadrant switches in the module. The modulation process determines the switching timing and duty cycles that achieve the desired voltage output from the module.

A gate control block interfaces with the power conversion hardware and provides the final gate drive signals to the semiconductor switches. The gate control block receives the gate control signals from the modulator and provides the appropriate voltage levels and current drive capability to operate the power semiconductor devices. The gate control block ensures proper switching operation of the IGBTs, MOSFETs, Silicon Carbide devices, or Gallium Nitride devices used in the two quadrant switches.

The voltage controller tracks the total voltage reference vmvˆxk(t) for each module by implementing closed-loop control that continuously adjusts the module output to match the reference. The total voltage reference vmvˆxk(t) follows a unipolar, albeit time-varying trajectory that combines the DC common-mode component, AC common-mode component, and AC differential-mode component. The voltage controller ensures that the actual module voltage follows this reference trajectory through continuous feedback control and adjustment of the switching patterns.

Loss Optimization Strategies

The method of controlling power flow comprises regulating only one module in each phase to produce time-varying voltage while other modules produce constant medium voltage port voltage to optimize component losses. This control approach recognizes that not all modules need to simultaneously produce time-varying voltage across the medium voltage terminal. The selective regulation of modules enables loss optimization by allowing some modules to operate at constant voltage levels while designated modules handle the time-varying voltage requirements.

The loss optimization strategy employs specific control algorithms that designate one module per phase as the "regulating module" while other modules operate as "supporting modules" with constant voltage references. The regulating module receives the full AC differential-mode voltage reference and tracks the time-varying voltage requirements to maintain power flow control and grid interface functions. The supporting modules receive only the DC common-mode voltage reference plus a constant offset, enabling them to operate at steady-state conditions. The control algorithm rotates the regulating module designation among the modules in each phase on a periodic basis, to ensure equal thermal stress distribution and component aging across all modules.

The switching patterns for loss optimization differentiate between regulating modules and supporting modules to minimize overall system losses. The switching pattern coordination ensures that the total voltage across all modules in each phase equals the required AC voltage while minimizing switching losses in the supporting modules. The control system monitors the power losses in each module through real-time measurement of switching currents and voltages, calculating instantaneous power loss as the product of switch voltage and current during switching transitions. The system adjusts the regulating module selection based on thermal measurements from temperature sensors located on the power semiconductor devices.

The optimization of component losses through selective module regulation reduces switching losses and improves overall system efficiency. Modules operating at constant medium voltage port voltage experience reduced switching stress and lower switching losses compared to modules that must track time-varying voltage references. The constant voltage operation enables these modules to operate in more efficient operating modes while the time-varying modules handle the dynamic voltage requirements of the system.

Linear or non-linear control strategies are implemented instead of PI/PR controllers for current and voltage control depending on the specific performance requirements and operating conditions. Non-linear control strategies include sliding mode control, model predictive control, or adaptive control algorithms that provide enhanced performance under varying operating conditions. These alternative control strategies offer improved dynamic response, better disturbance rejection, or enhanced robustness to parameter variations compared to conventional linear controllers.

The modular voltage control architecture enables independent control of each module while maintaining coordination with the overall system control objectives. Each module controller operates autonomously to regulate its local voltage while receiving reference signals from higher-level controllers that coordinate the operation of all modules in the cascaded configuration. The distributed control approach provides scalability and fault tolerance while maintaining system-level performance objectives.

Figure 11:
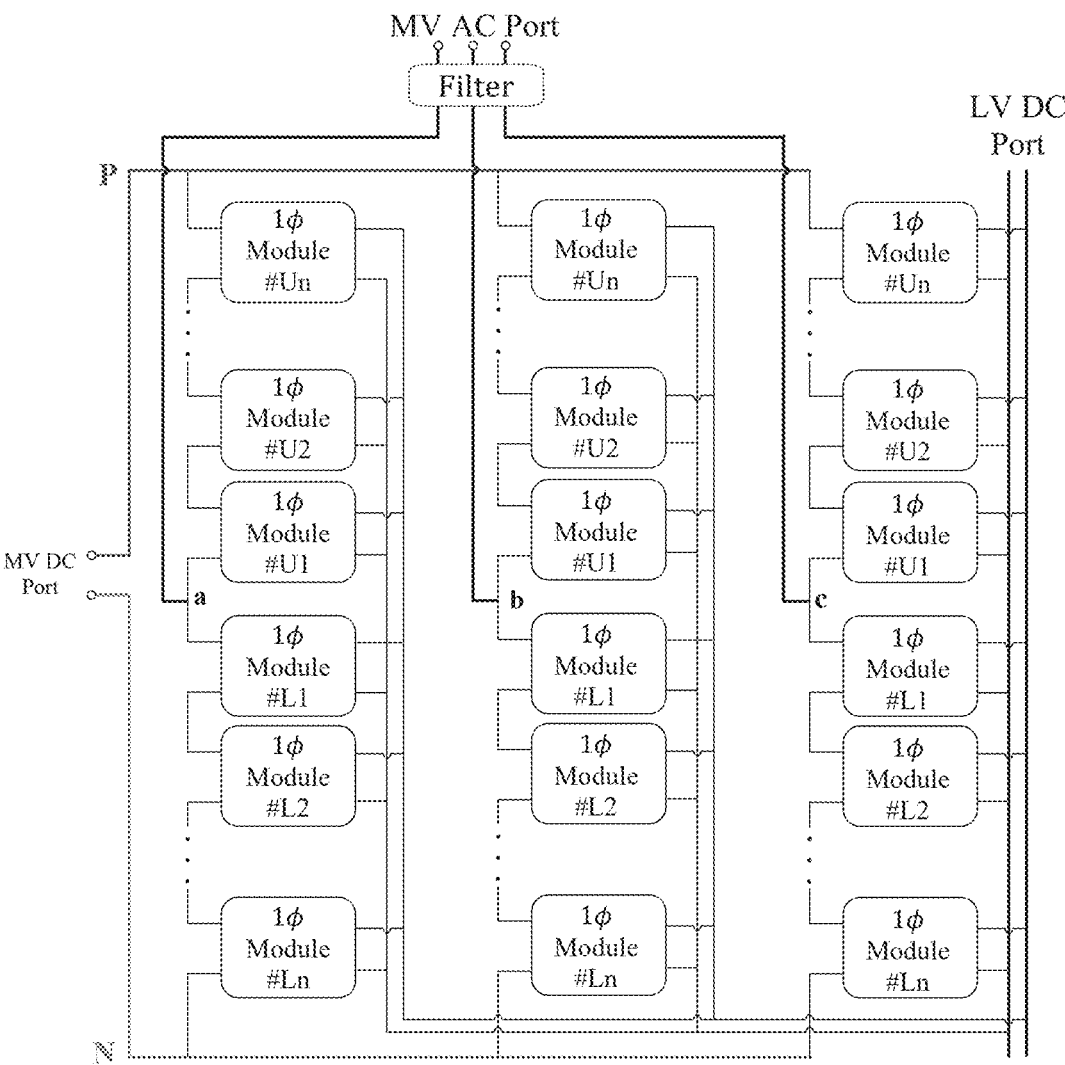
FIG. 11 illustrates a three-terminal solid-state transformer utilizing single-phase modules providing power conversion among MVAC, MVDC, and LVDC, according to aspects of the present disclosure.

Referring to FIG. 11, a three-terminal solid-state transformer architecture, with a medium voltage AC port, a medium voltage DC port, and a low voltage DC port, utilizes single-phase modules arranged as upper arm modules and lower arm modules in each phase of a three-phase configuration. The three-phase configuration includes phases a, b, and c, with each phase containing both upper arm modules and lower arm modules that are cascaded in series connection on their medium voltage sides. Each phase column contains multiple single-phase modules that are numbered sequentially, with the upper modules labeled as Module Un, Module U2, Module U1, and the lower modules labeled as Module L1, Module L2, through Module Ln. The cascaded stacking arrangement enables voltage scaling by connecting the modules in series on their medium voltage sides. A medium voltage DC interface is formed by connecting positive medium voltage terminals of uppermost modules and negative medium voltage terminals of lowermost modules. The positive DC terminals of the uppermost modules from all three phases converge at point P, while the negative DC terminals of the lowermost modules from all three phases converge at point N. The points P and N form the medium voltage DC interface that enables DC power flow at medium voltage levels.

A medium voltage AC interface is formed at junctions between the upper arm modules and lower arm modules of each phase. The junction points between the upper and lower arms in each phase provide the three-phase AC connection points for the medium voltage AC interface. The series connection of modules in each arm enables the system to handle medium voltage AC levels by distributing the voltage across multiple modules. The MV AC port connects through a filter to the three-phase system at the top of the structure. The filter provides electromagnetic interference suppression and power quality management for the medium voltage AC interface.

An LV DC port is positioned on the right side of the architecture where low voltage outputs from all modules are interconnected to form a single low voltage DC interface. The interconnection of the low voltage ports enables power from all modules to be combined and delivered through the single low voltage DC interface. The low voltage outputs are connected through horizontal bus connections that run across all three phase columns to combine the power from each module.

The MV DC port enables bidirectional DC power flow at medium voltage levels and connects to the cascaded module arrangement through the series connection topology. The medium voltage DC interface expands the functionality of the solid-state transformer system by providing both AC and DC medium voltage interfaces simultaneously.

The series-parallel connection topology enables voltage scaling on both the medium voltage and low voltage sides of the solid-state transformer system. On the medium voltage side, the series connection of modules within each phase distributes the medium voltage AC levels across multiple modules, allowing each individual module to operate at lower voltage stress while the overall system handles the full medium voltage range. The cascaded arrangement in each phase enables the system to handle higher medium voltage levels by adding more modules in series connection.

On the low voltage side, the parallel connection of module outputs enables current scaling and power combining to achieve the required low voltage DC specifications. The interconnection of low voltage ports from all modules increases the total current capacity and power handling capability of the low voltage DC interface. The parallel connection arrangement enables the system to deliver higher current levels at the low voltage DC port while maintaining the voltage level determined by the individual module specifications.

The dual medium voltage interface capability provides enhanced flexibility for power system applications that require both AC and DC medium voltage connections. The MV AC port enables connection to conventional three-phase AC power systems, while the MV DC port enables connection to DC power systems or DC transmission lines. The simultaneous availability of both AC and DC medium voltage interfaces expands the application range of the solid-state transformer system.

The cascaded single-phase module arrangement provides modularity and scalability for different voltage and power requirements. Additional modules are added to each phase column to increase the medium voltage handling capability, while the number of modules determines the voltage distribution across each phase. The modular architecture enables customization of the voltage and power ratings by adjusting the number of modules in each phase column according to specific application requirements.

The three-phase configuration with cascaded single-phase modules maintains operation across all three phases while providing galvanic isolation through the transformers embedded within each module. Each single-phase module operates independently while contributing to the overall three-phase power conversion function. The independent operation of modules within each phase enables fault tolerance and continued operation even if individual modules experience failures or require maintenance.

Figure 12:
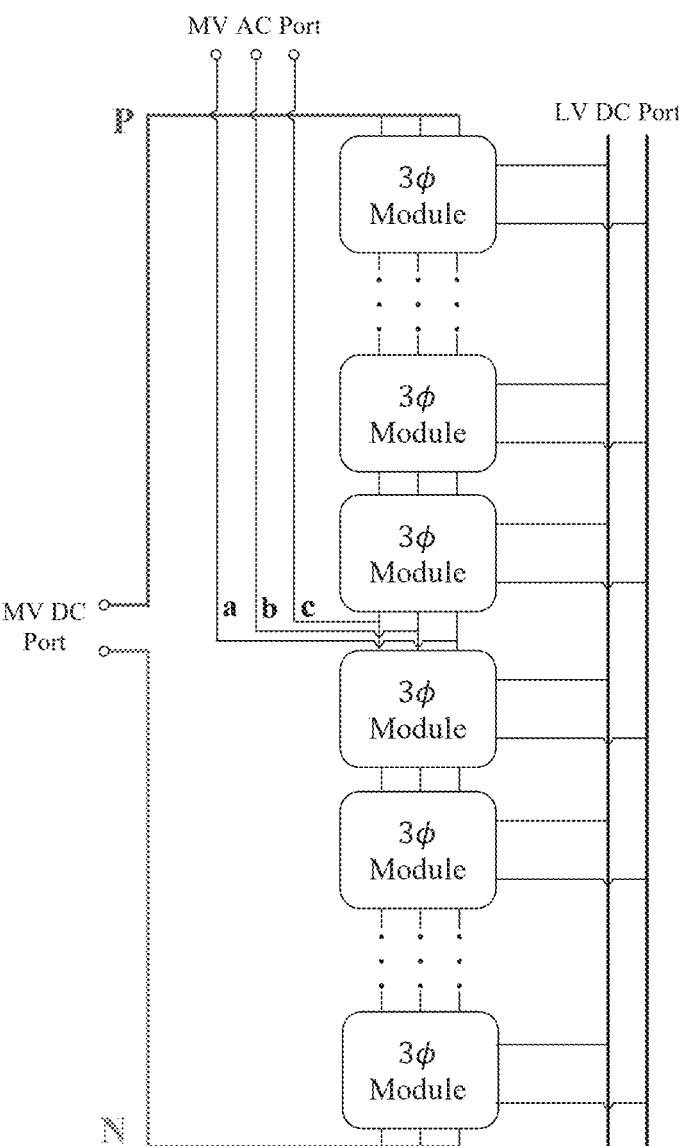
FIG. 12 depicts a three-terminal solid-state transformer utilizing three-phase modules providing power conversion among MVAC, MVDC, and LVDC, according to aspects of the present disclosure.

Referring to FIG. 12, a three-terminal solid-state transformer architecture following identical stacking configuration as the three-terminal system shown in FIG. 11, but using three-phase modules. Each three-phase module is represented as a rectangular block that contains integrated power conversion circuitry, shown in FIG. 3 or FIG. 4, for processing balanced three-phase power. Two sets of three-phase modules, each consisting of n three phase modules, are used to form the upper and lower arms.

An MV DC port connection point is indicated on the left side of the architecture and provides a medium voltage DC interface for the system. The medium voltage side DC positive terminals of the uppermost three phase module of the upper arm are tied together to form the positive connection P of the medium voltage DC terminal. The medium voltage side DC negative terminals of the bottommost three phase module of the lower arm are tied together to form the negative connection N of the medium voltage DC terminal.

A medium voltage AC interface is formed at junctions between the lowermost module of the upper arm and the uppermost module of the lower arm.

An LV DC port is positioned on the right side of the architecture where low voltage outputs from all modules are interconnected to form a single low voltage DC interface. The interconnection of the low voltage ports enables power from all modules to be combined and delivered through the single low voltage DC interface. The low voltage outputs are connected through horizontal bus connections to combine the power from each module.

The MV DC port connection enables bidirectional DC power flow at medium voltage levels and expands the functionality of the solid-state transformer system by providing both AC and DC medium voltage interfaces simultaneously. The medium voltage DC interface connects to the cascaded module arrangement through the series connection topology that distributes voltage across the stacked modules.

The cascaded modular approach handles medium voltage levels by distributing the total medium voltage across multiple three-phase modules connected in series configuration. Each individual three-phase module operates at a fraction of the total medium voltage while the combined modules in series handle the full medium voltage AC levels present at the MV AC port. The series connection of three-phase modules enables voltage scaling by adding or removing modules from the cascaded stack to accommodate different medium voltage requirements.

The three-phase modules in the cascaded configuration process three-phase power, which results in reduced current stress and improved efficiency compared to single-phase module arrangements. The integrated three-phase operation within each module eliminates the double-line frequency power pulsations that occur in single-phase systems, leading to reduced component stress and improved power quality at both the medium voltage interfaces and the low voltage DC interface.

The combination of LV outputs from all modules delivers the required DC power through the parallel connection arrangement at the LV DC port. The parallel interconnection of low voltage ports enables current scaling where the total current capacity equals the sum of individual module current contributions. The parallel connection maintains the voltage level determined by the individual three-phase module specifications while increasing the total power delivery capability of the system.

The dual medium voltage interface capability provides enhanced flexibility for power system applications that require both AC and DC medium voltage connections simultaneously. The MV AC port enables connection to conventional three-phase AC power systems, while the MV DC port enables connection to DC power systems, energy storage systems, or DC transmission lines. The availability of both interfaces within a single solid-state transformer system eliminates the need for separate AC-DC conversion equipment.

The modular architecture enables scalability by adjusting the number of three-phase modules in the cascaded stack to meet specific voltage and power requirements. Additional three-phase modules are stacked in series to increase the medium voltage handling capability, while the modular design maintains manufacturing consistency and reduces system complexity compared to custom-designed transformers. The standardized three-phase module approach enables mass production benefits and simplified maintenance procedures.

The series-parallel connection topology optimizes voltage and current distribution throughout the solid-state transformer system. The series connection on the medium voltage side distributes voltage stress across multiple modules, enabling the use of lower voltage-rated components within each module while achieving high overall voltage capability. The parallel connection on the low voltage side combines current contributions from all modules to achieve high power delivery capability at the low voltage DC interface.

Figure 13:
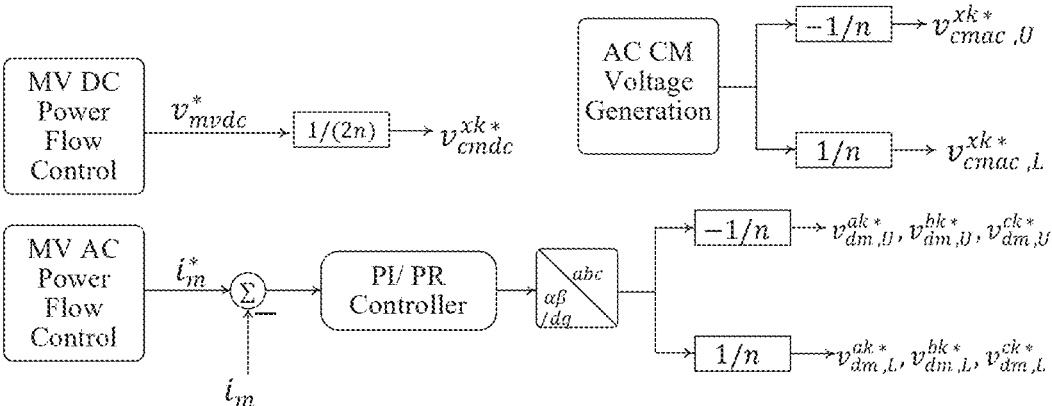
FIG. 13 depicts a control system block diagram for medium voltage AC power flow control architecture, according to aspects of the present disclosure.

Referring to FIG. 13, a control system block diagram for a three-terminal solid-state transformer system, shown in FIG. 11 and FIG. 12, comprises two parallel control paths that manage medium voltage DC power flow and medium voltage AC power flow independently. The control structure differs from the two-terminal solid-state transformer configurations, shown in FIG. 5 and FIG. 6, in that the DC common-mode reference is directly determined by the desired voltage across the medium voltage DC interface rather than being set arbitrarily. This constraint arises from the three-terminal architecture where the medium voltage DC port voltage directly depends on the DC common-mode voltage components across the cascaded modules. The upper control path labeled "MV DC Power Flow Control" manages the DC power flow through the medium voltage DC interface of the three-terminal solid-state transformer system. The "MV DC Power Flow Control" algorithm generates the total desired voltage reference across the medium voltage DC port, which is equally distributed among the 2n modules connected in series across the medium voltage DC port and hence is scaled by the "1/(2n)" gain block to generate vcm,dc,xk, which represents the DC common-mode voltage reference for any module k in phase x.

The lower control path labeled "MV AC Power Flow Control" manages the AC power flow through the medium voltage AC interface of the three-terminal solid-state transformer system. An upper level controller, either grid following or grid forming, generates differential mode current reference. The current reference, along with the actual measurements from the medium voltage AC interface are used to generate error signals for AC power flow control. The PI/PR controller block implements proportional-integral or proportional-resonant control algorithms to minimize this AC power flow error and achieve accurate tracking of AC power flow references. The PI/PR controller generates intermediate control signals that are further processed to create the final voltage references for the modules. The PI/PR controller generates voltage reference for the lower arm, which consists of n modules. Hence the output of the PI/PR controller is scaled by 1/n to produce differential mode AC voltage reference for each module in the lower arm. The upper arm modules receive the same valued differential mode voltage references but with opposite polarity.

The controller is configured to generate voltage references for the modules, wherein the voltage references comprise a DC common-mode component and an AC differential-mode component, and optionally an AC common-mode component. The DC common-mode component is determined by a desired voltage across the medium voltage DC interface and ensures unipolar voltage operation across the medium voltage port of each module. The direct relationship between the DC common-mode component and the medium voltage DC interface voltage distinguishes the three-terminal configuration from the two-terminal configuration where the DC common-mode voltage is set arbitrarily.

The controller generates the voltage references further comprising an AC common-mode component and an AC differential-mode component. AC common mode and AC differential mode voltage references are generated with equal magnitude but opposite polarity for the upper and lower arm modules. The AC differential-mode component carries the power flow information for the medium voltage AC interface, while the AC common-mode component provides additional voltage utilization capability. The AC common-mode component is generated using third-harmonic injection to maximize bus voltage utilization while maintaining the constraint that the AC common-mode component does not affect power flow at any of the three terminals.

The AC common-mode component does not affect power flow at any of the three terminals because common-mode voltages are eliminated at the differential connections of the three-terminal architecture. The medium voltage AC interface operates as a differential three-phase three wire system where common-mode voltages do not contribute to power transfer. Similarly, the medium voltage DC interface and low voltage DC interface are not affected by AC common-mode voltages due to the filtering and isolation provided by the module configurations.

The separation of DC and AC power flow control paths enables independent management of power flow through the medium voltage DC interface and medium voltage AC interface simultaneously. The DC power flow control path regulates the voltage and current at the medium voltage DC port, while the AC power flow control path manages the three-phase power flow at the medium voltage AC port. The independent control paths enable the three-terminal solid-state transformer system to operate as a power flow hub that interconnects AC and DC power systems.

The control action is performed by a centralized controller or in a distributed fashion by a collection of digital controllers. A centralized controller implementation processes both the MV DC power flow control and MV AC power flow control functions within a single processing unit, enabling coordinated control of all three terminals. Distributed control implementations divide the control functions among multiple digital controllers, with dedicated controllers for DC power flow control and AC power flow control, while module-level controllers implement the local voltage regulation functions.

The distributed control approach enables scalability and fault tolerance by distributing the computational load among multiple controllers and providing redundancy in the control system. Module-level controllers implement the voltage references generated by the higher-level DC and AC power flow controllers, enabling local voltage regulation while maintaining coordination with the overall system control objectives. The distributed architecture reduces the computational burden on individual controllers and enables parallel processing of control functions for improved dynamic response.

Figure 14:
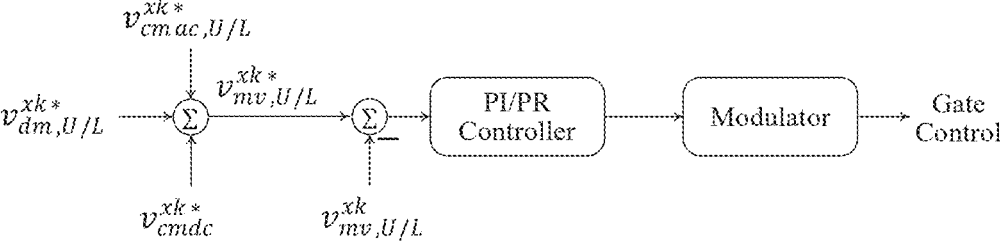
FIG. 14 depicts a control system block diagram for the two-terminal solid-state transformer with voltage control loops, according to aspects of the present disclosure.

Referring to FIG. 14, a voltage control loop structure for the three-terminal solid-state transformer that serves as the innermost control layer in each module. The DC common mode, AC common mode, and AC differential mode components of the voltage references are combined to form the total voltage reference for the MV bus of each module. The total voltage reference, along with the actual measured voltages, are used by a PI/PR controller, which perform proportional-integral or proportional-resonant compensation to generate control signals for the modulator. The modulator produces appropriate gate control signals for the module.

A gate control block receives the modulation signals and provides the final gate drive signals to the power semiconductor switches in the solid-state transformer modules. The gate control block interfaces with the power conversion hardware and provides appropriate voltage levels and current drive capability to operate the semiconductor devices. The gate control output drives the IGBTs, MOSFETs, Silicon Carbide devices, or Gallium Nitride devices used in the two quadrant switches of each module.

Figure 15:
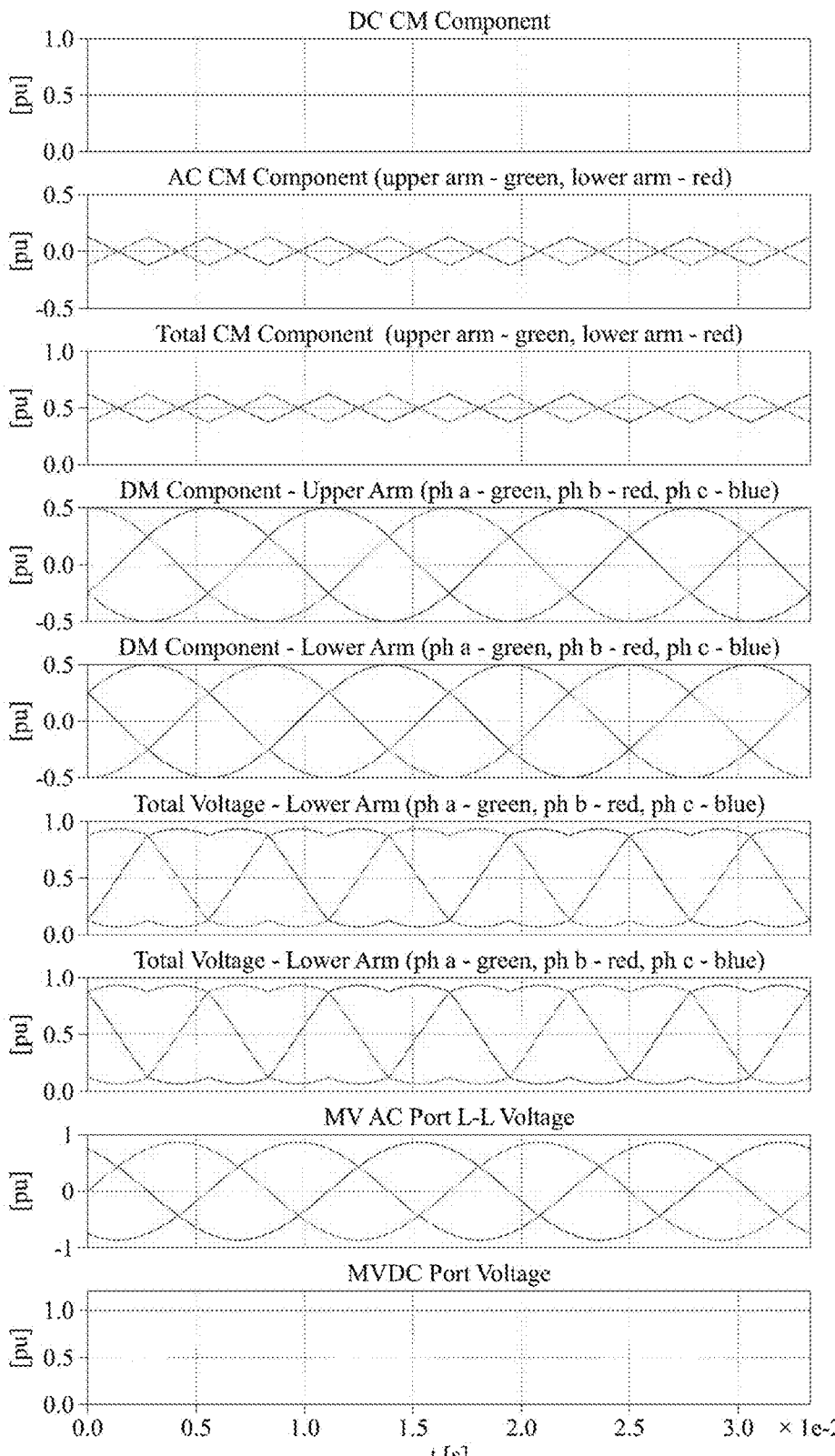
FIG. 15 presents time-domain waveform plots illustrating voltage components in the three-terminal solid-state transformer system, according to aspects of the present disclosure.

The current control loop structure enables measured phase currents to be compared against reference values for generating gate control signals for power semiconductor switches in the solid-state transformer modules. The closed-loop current control provides fast dynamic response for current regulation and power flow control between the AC and DC interfaces Referring to FIG. 15, the ten time-domain waveform plots illustrate various voltage components in a three-terminal solid-state transformer system spanning approximately 35 milliseconds of operation. The waveforms demonstrate the voltage composition and transformation characteristics that enable the three-terminal system to provide simultaneous medium voltage AC, medium voltage DC, and low voltage DC interfaces through coordinated control of upper arm modules and lower arm modules.

The top plot shows a DC common-mode component, identical for modules in upper and lower arms, maintaining a constant value at 0.5 per unit throughout the entire time period. This DC common-mode component provides the baseline voltage level that establishes the medium voltage DC interface voltage and ensures unipolar voltage operation across the medium voltage ports of all modules in both upper and lower arms. The constant nature of the DC common-mode component directly corresponds to the steady voltage level required at the medium voltage DC port.

The second plots display AC common-mode components for the upper and lower arm modules, showing oscillations at third order harmonic frequencies around zero with amplitude approximately ±0.2 per unit. The green and red colored waveforms correspond to upper and lower arm modules, respectively. The AC common-mode components are generated using third-harmonic injection to maximize bus voltage utilization while maintaining the constraint that these components do not contribute to power flow at any of the three terminals. The upper arm AC common-mode component and lower arm AC common-mode component exhibit similar oscillation patterns with opposite polarity to optimize voltage utilization in their respective arm configurations.

The third plot shows the total common mode component combining AC and DC part for the upper and lower arm modules marked by green and red, respectively, which oscillate around 0.5 per unit, which ensures unipolar voltage operation across the medium voltage buses in the modules.

The fourth and fifth plots present differential-mode components for the upper and lower arms, exhibiting three-phase sinusoidal waveforms with green, red, and blue traces representing phases a, b, and c respectively. The differential-mode components oscillate with amplitudes of approximately ±0.5 per unit and maintain 120-degree phase displacement between phases to preserve balanced three-phase operation. The controller generates AC differential-mode voltage references with opposite polarity for the upper arm modules and the lower arm modules, as demonstrated by the phase relationship between the upper arm differential-mode components and lower arm differential-mode components.

The sixth and seventh plots show total voltage waveforms that combine the DC common-mode, AC common-mode, and differential-mode components for the upper and lower arms respectively. These total voltage waveforms display three-phase rectified sinusoidal patterns oscillating between approximately 0 and 1.0 per unit, with the waveforms remaining unipolar throughout the operating cycle. The unipolar characteristic demonstrates that the DC common-mode component ensures unipolar voltage operation across the medium voltage port of each module while the combined voltage components enable proper power flow control.

The eighth plot illustrates the medium voltage AC port line-to-line voltage as three-phase sinusoidal waveforms with amplitude approximately ±1 per unit. These waveforms represent the differential voltages present at the medium voltage AC interface after the common-mode components are eliminated through the differential connection arrangement. The balanced three-phase sinusoidal characteristics demonstrate proper AC interface operation for connection to medium voltage AC power systems.

The ninth plot shows the medium voltage DC port voltage as a constant horizontal line at approximately 1.0 per unit. The constant medium voltage DC port voltage demonstrates the DC interface capability of the three-terminal system and shows how the DC common-mode components across all modules combine to establish the steady DC voltage level. The constant nature of this voltage enables reliable DC power flow through the medium voltage DC interface.

The AC common-mode components for both upper and lower arms do not affect power flow at any of the three terminals because common-mode voltages are eliminated at the differential connections of the medium voltage AC interface, do not contribute to the DC voltage level at the medium voltage DC interface, and are isolated from the low voltage DC interface through the transformer isolation within each module. The third-harmonic injection strategy used to generate the AC common-mode components provides additional voltage utilization capability without impacting the power transfer characteristics at any terminal.

The opposite polarity generation of AC differential-mode voltage references for upper arm modules and lower arm modules enables the three-terminal system to synthesize the required AC voltages at the medium voltage AC interface while maintaining proper voltage distribution across the cascaded modules in each arm. The upper arm modules receive differential-mode references that are 180 degrees out of phase with the differential-mode references provided to the lower arm modules, creating the voltage differences needed to establish the AC interface voltages.

The voltage synthesis demonstrated in the waveforms shows how the combination of DC common-mode, AC common-mode, and AC differential-mode components enables the three-terminal solid-state transformer system to simultaneously provide three different voltage interfaces while maintaining unipolar voltage operation within each individual module. The coordinated control of voltage components across upper and lower arms enables the system to function as a power conversion hub that interconnects AC and DC power systems at different voltage levels.

Figure 16:
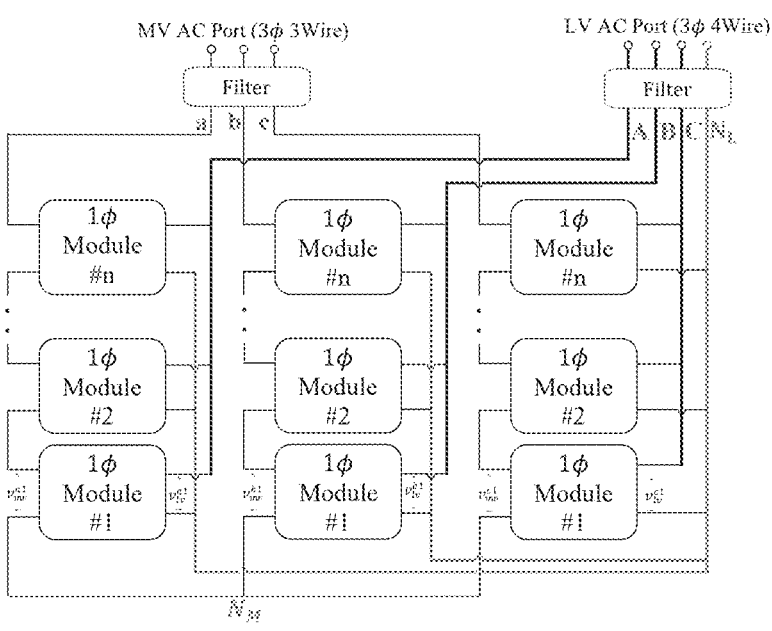
FIG. 16 depicts a two-terminal solid-state transformer architecture utilizing single-phase modules with Y-connected medium voltage ports and parallel-connected low voltage DC outputs providing a power conversion between three-phase three-wire MVAC and three-phase four-wire LVAC, according to aspects of the present disclosure.

Referring to FIG. 16, a two terminal solid state transformer architecture is obtained using identical physical connection of the modules on the MV as that used in the two terminal structure FIG. 5. Similar to the system in FIG. 5, the modules here also leverage DC CM voltage on the MV side to ensure unipolar voltage across the MV bus despite connecting to an medium voltage AC grid. The low voltage ports of the single phase modules corresponding to medium voltage grid phase a are connected in parallel. The low voltage ports of the single phase modules in other phase stacks are similarly connected to produce phase b and phase c of a low voltage AC port. The DC negative terminals of the lowermost (#1) modules from all three phases are tied together at $N_L$ to form a Y configuration. To ensure unipolar voltage on the LV bus in each module, DC common mode voltage is used (similar to that on the MV side). AC common mode voltage can also be used to maximize bus voltage utilization. However, to maintain the DC common voltage on both the medium and low voltage sides, a common mode path is needed and hence, the neutral point $N_L$ of the Y-connection on the low voltage side is used as the $4^{th}$ wire on the low voltage AC port. The system is controlled to draw necessary common mode current/power from the three phase four wire connection on the low voltage AC port. This configuration provides a medium voltage AC to low voltage AC conversion topology.

Figure 17:
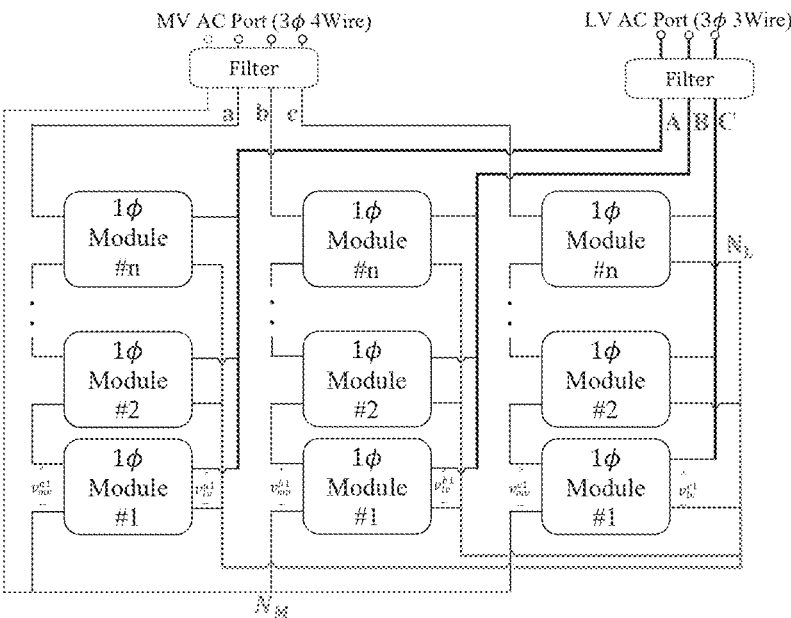
FIG. 17 depicts a two-terminal solid-state transformer architecture utilizing single-phase modules with Y-connected medium voltage ports and parallel-connected low voltage DC outputs providing a power conversion between three-phase four-wire MVAC and three-phase three-wire LVAC, according to aspects of the present disclosure.

Referring to FIG. 17, another variant of the two terminal solid state transformer, as shown in FIG. 16, can be obtained using the neutral point on the medium voltage side as a fourth connection to construct a three phase four wire medium voltage AC port. In such a configuration, a three phase three wire configuration can be used on the low voltage side.

Figure 18:
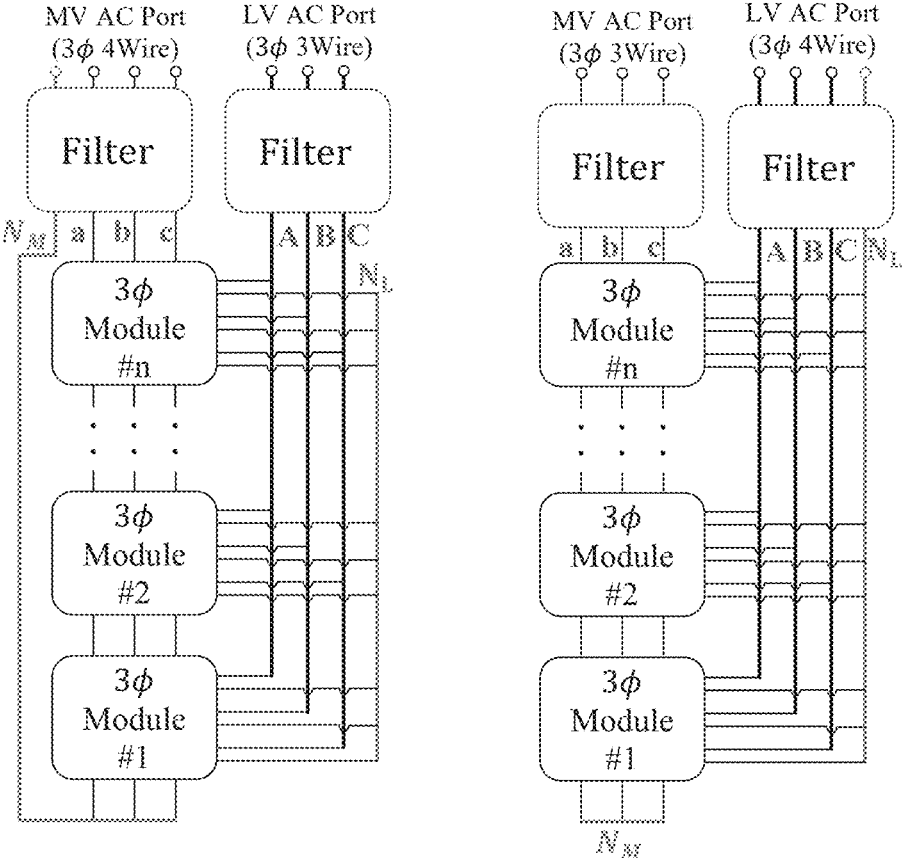
FIG. 18 depicts solid-state transformer architectures for medium voltage AC to low voltage AC conversion utilizing cascaded three-phase modules with four-wire and three-wire configurations, according to aspects of the present disclosure.

Referring to FIG. 18, two solid-state transformer system architectures show the variants of the two terminal systems, shown in FIG. 16 and FIG. 17, using three-phase modules. The systems provide connection between medium voltage AC ports and low voltage AC ports through cascaded modular configurations. The left diagram illustrates a three-phase four-wire MVAC connection interfacing with a three-phase three-wire LVAC connection, while the right diagram shows the inverse configuration with a three-phase three-wire MVAC connection interfacing with a three-phase four-wire LVAC connection. Both architectures employ filter components on both the MV and LV sides and utilize series-connected modules on the medium voltage side.

Figure 19:
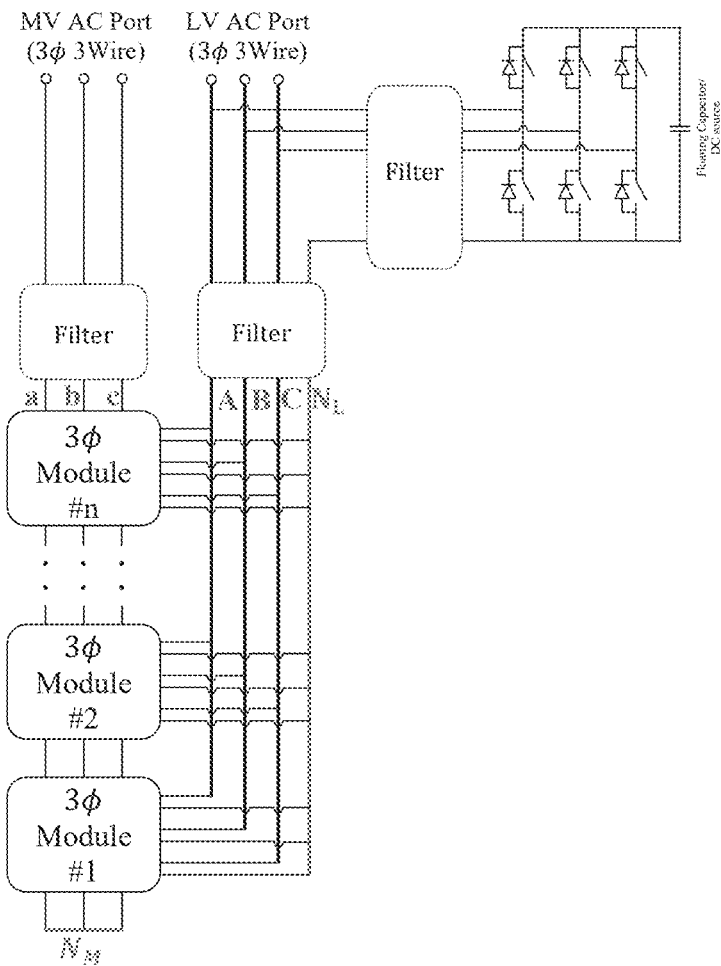
FIG. 19 depicts a two-terminal solid-state transformer architecture with Y-connected medium voltage AC ports and low voltage AC output through cascaded single-phase modules, according to aspects of the present disclosure.

Referring to FIG. 19, medium voltage AC to low voltage AC conversion can be achieved using this solid state topology even when both AC connections on the medium voltage and low voltage sides are three-wire connections. The system includes an additional DC-DC stage, which can be designed with fractional power rating compared to the full converter and is used to maintain/supply the common mode current/power only. In such a configuration, this DC-DC stage may be isolated or non-isolated and can have only a DC bus capacitor (similar to an active power filter) or may be connected to a DC source. The DC bus of this DC-DC stage can be used as a low voltage DC port port as well if designed for appropriate power level. Such a conversion system can be realized identically using single phase modules.

Figure 20:
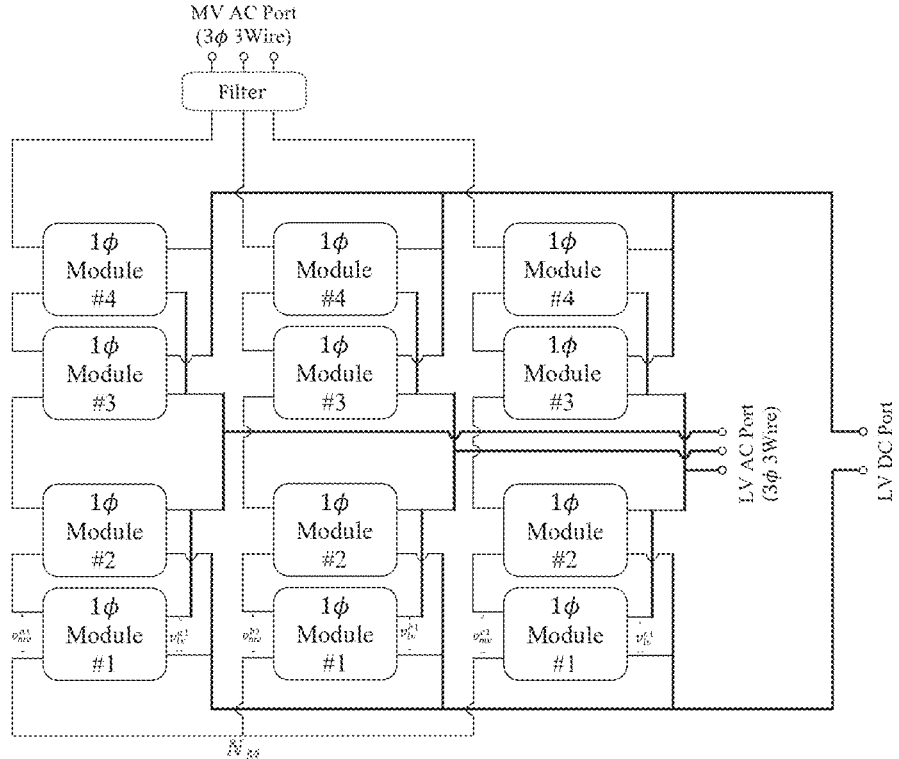
FIG. 20 depicts a three-terminal solid-state transformer architecture utilizing single-phase modules providing power conversion among MVAC, LVAC, and LVDC, according to aspects of the present disclosure.

Referring to FIG. 20, a three terminal solid state transformer providing conversion among medium voltage AC, low voltage DC, and low voltage AC using single phase modules. Here, only four modules are used in each phase and only one low voltage DC port is shown. Any number of modules/ports can be used for desired voltage and power level. The physical connection and control strategy of the medium voltage side of the modules is identical to that of the solid state transformer shown in FIG. 5. However, on the low voltage side, the modules in each phase are grouped into upper and lower arms. Modules #1 and #2 form the lower arm and modules #3 and #4 form the upper arms in each phase. The DC positive terminals of the modules of the upper arms from the three phases are tied together to form the positive terminal of the low voltage DC port. The DC negative terminals of the modules in the lower arms in the three phases are tied together to form the DC negative terminal of the low voltage DC port. The DC negative terminal of module #3 and the DC positive terminal of module #2 in each phase are tied together to form the respective phase terminal of the low voltage AC port. The DC common mode, AC common mode, and AC differential mode voltage components are generated following identical strategy used on the medium voltage side of the three terminal system shown in FIG. 11. Essentially, the DC common mode voltage component in each module is used to control the total voltage on the low voltage DC port. The AC common mode and AC differential mode voltage components are generated with opposite polarity for the upper and lower arms, where the AC common mode component does not affect power flow at any port. The AC differential mode voltage component is used to regulate the power flow at the low voltage AC port. Here, parallel connection of the low voltage ports of the modules in each upper and lower arm is used, but series connection may also be used to reach desired voltage level. An three terminal system can be built identically using three phase modules as well.

Figure 21:
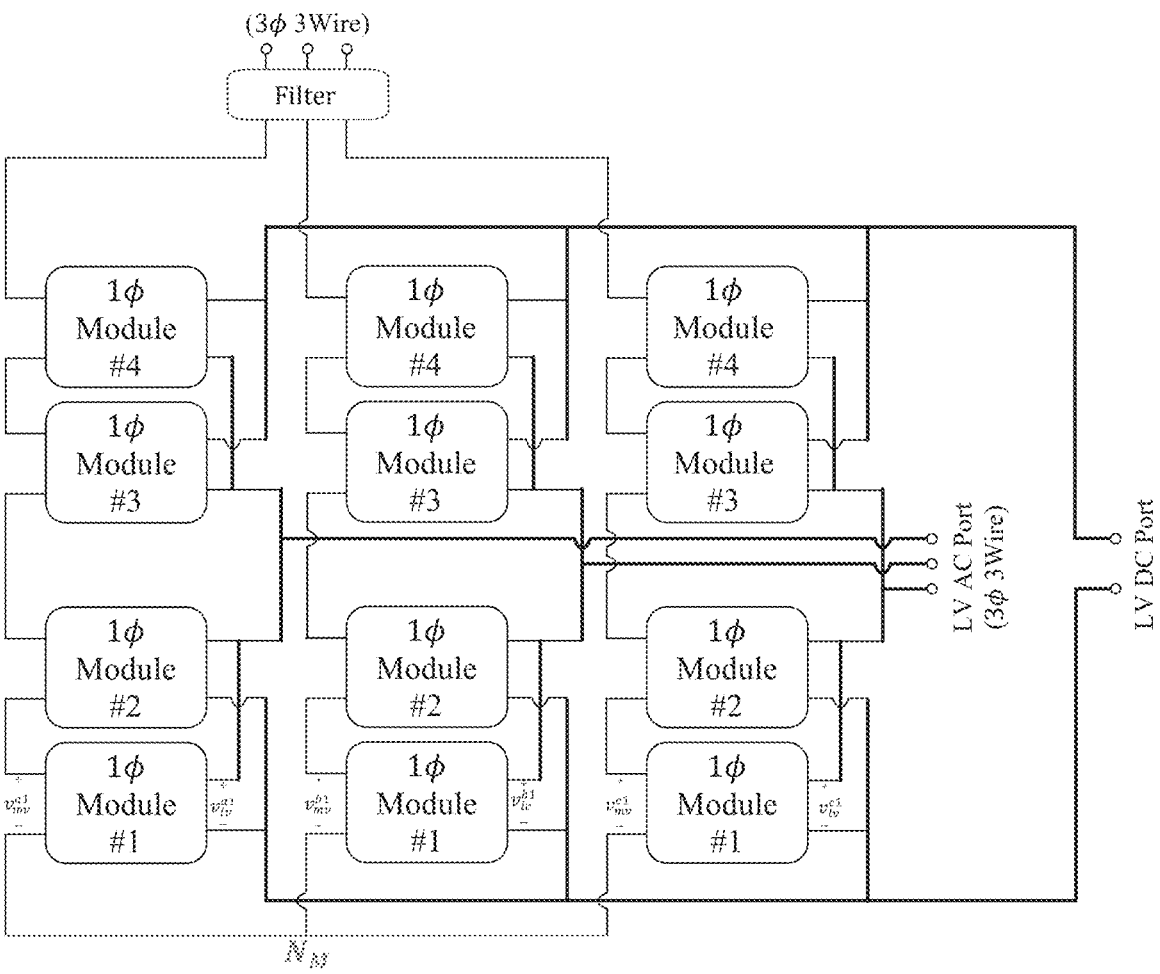
FIG. 21 depicts a four-terminal solid-state transformer architecture utilizing single-phase modules providing power conversion among MVAC, MVDC, LVAC, and LVDC, according to aspects of the present disclosure.

Referring to FIG. 21, a four terminal solid state transformer provides simultaneous power conversion among medium voltage AC, medium voltage DC, low voltage AC, and low voltage DC. The connection and control strategy on the medium voltage side and low voltage sides follow the same common mode and differential mode principles used on the medium voltage side of the system shown in FIG. 11 and on the low voltage side of the system shown in FIG. 20, respectively. An identical system can be constructed using single phase modules.

A number of implementations have been described. Nevertheless, it will be understood that various modifications may be made without departing from the spirit and scope of the disclosure. Accordingly, other implementations are within the scope of the following claims.

What is claimed:

1. A solid-state transformer system, comprising:
   a plurality of isolated DC-DC converter modules, each module having a medium voltage port and a low voltage port, wherein the medium voltage ports of the modules are series-connected in each phase of a three-phase Y-configuration to form a medium voltage AC interface; and
   a controller configured to generate voltage references for medium voltage port of each module, the voltage references comprising a DC common-mode component and an AC differential-mode component, and optionally an AC common-mode component, wherein the DC common-mode component ensures unipolar voltage operation across the medium voltage port of each module; and
   wherein each isolated DC-DC converter module comprises two quadrant switches on the low voltage and the medium voltage ports.

2. The solid-state transformer system of claim 1, wherein the low voltage ports of the modules are interconnected to form a low voltage DC interface.

3. The solid-state transformer system of claim 1, wherein the low voltage ports of the modules are series or parallel connected in each phase of a three phase Y-configuration to form a low voltage AC interface; and a controller configured to generate voltage references for low voltage port of each module, the voltage references comprising a DC common-mode component and an AC differential-mode component, and optionally an AC common-mode component, wherein the DC common-mode component ensures unipolar voltage operation across the low voltage port of each module; and wherein three-phase four-wire connection is used on either or both medium voltage and low voltage AC interfaces or a separate isolated or non-isolated DC-DC stage is used on either of the AC interfaces to maintain a common mode DC voltage on both medium voltage and low voltage sides.

4. The solid-state transformer system of claim 1, wherein the low voltage ports of the modules are series or parallel connected to form an upper arm and a lower arm in each of the three phases;

a low voltage DC interface formed by connecting positive terminals of uppermost modules of the upper arms and negative terminals of lowermost modules of the lower arms;

a low voltage AC interface formed at junctions between the upper arm modules and lower arm modules of each phase;

a controller configured to generate voltage references for a low voltage side of the modules, wherein the voltage references comprise a DC common-mode component and an AC differential-mode component, and optionally an AC common-mode component, wherein the DC common-mode component is determined by a desired voltage across the low voltage DC interface and ensures unipolar voltage operation across the low voltage port of each module; and the controller generates AC differential-mode voltage references with opposite polarity for the upper arm modules and the lower arm modules.

5. A solid-state transformer system, comprising:

a plurality of isolated DC-DC converter modules arranged as upper arm modules and lower arm modules in each phase of a three-phase configuration, wherein each module has a medium voltage port and a low voltage port;

a medium voltage DC interface formed by connecting positive terminals of uppermost modules and negative terminals of lowermost modules;

a medium voltage AC interface formed at junctions between the upper arm modules and lower arm modules of each phase;

a controller configured to generate voltage references for a medium voltage side of the modules, wherein the voltage references comprise a DC common-mode component and an AC differential-mode component, and optionally an AC common-mode component, wherein the DC common-mode component is determined by a desired voltage across the medium voltage DC interface and ensures unipolar voltage operation across the medium voltage port of each module; and the controller generates AC differential-mode voltage references with opposite polarity for the upper arm modules and the lower arm modules.

6. The solid-state transformer system of claim 5, wherein a low voltage DC interface formed by interconnecting the low voltage ports of the modules.

7. The solid-state transformer system of claim 5, wherein the low voltage ports of the modules are series or parallel connected to form an upper arm and a lower arm in each of the three phases;

a low voltage DC interface formed by connecting positive terminals of uppermost modules of the upper arms and negative terminals of lowermost modules of the lower arms;

a low voltage AC interface formed at junctions between the upper arm modules and lower arm modules of each phase;

a controller configured to generate voltage references for the low voltage side of the modules, wherein the voltage references comprise a DC common-mode component and an AC differential-mode component, and optionally an AC common-mode component, wherein the DC common-mode component is determined by a desired voltage across the low voltage DC interface and ensures unipolar voltage operation across the low voltage port of each module; and the controller generates AC differential-mode voltage references with opposite polarity for the upper arm modules and the lower arm modules.

8. The solid-state transformer system of claim 6, using integrated three-phase DC-DC modules, wherein an integrated three-phase DC-DC module uses three separate transformer cores and low voltage side windings are delta-connected to provide one or more low voltage ports.

9. The solid-state transformer system of claim 6, using magnetically coupled three-phase DC-DC modules, wherein a magnetically coupled three-phase DC-DC module uses a single transformer core with at least three windings on the medium voltage side and one or more windings on the low voltage side.

10. The solid-state transformer system of claim 6, wherein each isolated DC-DC converter module utilizes a conversion topology selected from the group consisting of:

pulse-width modulated push-pull converters;

frequency modulated resonant converters;

phase-shift modulated converters comprising dual active bridge converters and multi-active bridge converters; and hybrid conversion topologies comprising quasi-resonant dual active bridge or multi-active bridge converters.

11. The solid-state transformer system of claim 10, wherein the isolated DC-DC converter modules achieve soft switching such as zero voltage switching (ZVS) or zero current switching (ZCS) or both for medium voltage side switches or low voltage switches or both based on power flow direction.

12. The solid-state transformer system of claim 10, wherein the controller generates an AC common-mode component using third-harmonic injection to maximize bus voltage utilization.

13. The solid-state transformer system of claim 10, wherein the AC common-mode component does not contribute to power flow at the medium voltage AC interface.

14. The solid-state transformer system of claim 1, wherein the modules comprise magnetically coupled three-phase modules having a core configuration with three legs arranged in a common magnetic structure fabricated from ferrite material or nanocrystalline magnetic material.

15. The solid-state transformer system of claim 13, wherein magnetically coupled three-phase modules provide constant power flow over a transformer core by combining double-line frequency oscillating single-phase power from three grid phases.

16. The solid-state transformer system of claim 1, wherein each module includes two low voltage ports with independent transformer secondary windings.

17. The solid-state transformer system of claim 1, wherein the low voltage ports are connected in series to increase total output voltage.

18. The solid-state transformer system of claim 1, wherein the low voltage ports are connected in parallel to increase total output current capacity.

19. A method of controlling a cascaded modular solid-state transformer, the method comprising:

generating voltage references for medium voltage buses by combining a DC common-mode voltage component, an AC common-mode voltage component, and an AC differential-mode voltage component;

regulating the DC common-mode voltage component to ensure unidirectional voltage operation across medium voltage ports while connected to a three-phase AC source; and controlling power flow between a medium voltage AC interface and a low voltage DC interface.

20. The method of claim 19, wherein the AC common-mode voltage component is generated using third-harmonic injection to maximize bus voltage utilization.

21. The method of claim 20, wherein the AC common-mode voltage component does not affect power flow at the medium voltage AC interface.

22. The method of claim 19, wherein controlling power flow comprises regulating only one module in each phase to produce time-varying voltage while other modules produce constant medium voltage port voltage to optimize component losses.

23. The method of claim 19, further comprising:

pre-charging medium voltage DC bus capacitors in each module through controlled current injection from the low voltage DC interface;

limiting pre-charging current to 10% to 20% of nominal module current rating; and proceeding sequentially from lowest voltage module to highest voltage module.

24. The method of claim 19, further comprising:

monitoring overcurrent conditions with thresholds set at 110% to 150% of nominal current ratings;

monitoring overvoltage conditions with thresholds set at 110% to 120% of nominal DC bus voltage; and monitoring overtemperature conditions with thresholds set at 125° C. to 150° C. for silicon devices.

* * * * *